(12) United States Patent
Poulsen et al.

(10) Patent No.: US 7,809,029 B2
(45) Date of Patent: Oct. 5, 2010

(54) ARTICLES COMPRISING AN OPTICAL FIBRE WITH A FIBRE BRAGG GRATING AND METHODS OF THEIR PRODUCTION

(75) Inventors: Christian Vestergaard Poulsen, Farum (DK); Lars Voxen Hansen, Copenhagen V (DK); Ole Sigmund, Kgs. Lyngby (DK); Jens Engholm Pedersen, Birkerød (DK); Martijn Beukema, Brussels (BE)

(73) Assignee: NKT Photonics A/S, Birkerod (DK)

( * ) Notice: Subject to any disclaimer, the term of this patent is extended or adjusted under 35 U.S.C. 154(b) by 0 days.

(21) Appl. No.: 11/629,520

(22) PCT Filed: Jun. 17, 2005

(86) PCT No.: PCT/EP2005/052836
§ 371 (c)(1),
(2), (4) Date: Dec. 14, 2006

(87) PCT Pub. No.: WO2006/000543
PCT Pub. Date: Jan. 5, 2006

(65) Prior Publication Data
US 2007/0183464 A1  Aug. 9, 2007

Related U.S. Application Data

(60) Provisional application No. 60/582,089, filed on Jun. 24, 2004.

(30) Foreign Application Priority Data

Jun. 24, 2004  (DK) ............................... 2004 00990
Mar. 29, 2005  (DK) ............................... 2005 00431

(51) Int. Cl.
*H01S 3/30* (2006.01)

(52) U.S. Cl. ............................... 372/6; 372/93; 372/98; 372/102

(58) Field of Classification Search .................... 372/6, 372/93, 102, 98
See application file for complete search history.

(56) References Cited

U.S. PATENT DOCUMENTS 4,795,226 A  1/1989  Bennion et al.
(Continued)

FOREIGN PATENT DOCUMENTS

JP  62-198808 A  9/1987
(Continued)

OTHER PUBLICATIONS

International Search Report mailed Apr. 4, 2006 in corresponding International Appl. No. PCT/EP2005/052836, European Patent Office, Rijswijk, NL.
(Continued)

*Primary Examiner*—Minsun Harvey
*Assistant Examiner*—Kinam Park
(74) *Attorney, Agent, or Firm*—Buchanan Ingersoll & Rooney PC

(57) ABSTRACT

The invention relates to an article comprising a length of an optical fiber and a package, the optical fiber comprising a fiber Bragg grating dispersed over a FBG-section of the length of the optical fiber, the package comprising a carrier with a carrier surface for supporting at least a supported part of the optical fiber including the FBG-section. The invention further relates to an apparatus comprising the article, to its use and to a method of manufacturing such an article. The object of the present invention is to seek to provide an optimized (e.g. elongate) package having a relatively low sensitivity to mechanical vibrations from the environment. This is achieved by providing that the carrier surface for supporting the optical fiber comprising a fiber Bragg grating is convex in a longitudinal direction of the optical fiber during use of the article. This has the advantage of providing a lowering of the influence of vibrations from acoustic sources (or other sources of mechanical vibration) in the environment compared to prior art solutions. In an embodiment, the carrier comprises two different materials, each adapted to provide a specific tuning of the wavelength selected by the fiber Bragg grating. The invention may e.g. be used for the fiber lasers for sensing, (low frequency/low phase noise fiber lasers) in wavelength tuneable fiber lasers, and in packaging of fiber lasers in general.

72 Claims, 13 Drawing Sheets

U.S. PATENT DOCUMENTS

| | | | |
|---|---|---|---|
| 5,007,705 | A | 4/1991 | Morey et al. |
| 5,694,501 | A * | 12/1997 | Alavie et al. .................. 385/37 |
| 6,240,220 | B1 | 5/2001 | Pan et al. |
| 6,449,293 | B1 * | 9/2002 | Pedersen et al. ............... 372/6 |
| 2002/0131709 | A1 | 9/2002 | Miller et al. |
| 2002/0181908 | A1 | 12/2002 | Pedersen et al. |
| 2003/0012523 | A1 | 1/2003 | Shinozaki et al. |

FOREIGN PATENT DOCUMENTS

| | | |
|---|---|---|
| JP | 2002-303739 A | 10/2002 |
| JP | 2003-66247 A | 3/2003 |
| JP | 2003-172833 A | 6/2003 |
| WO | 98-36300 A2 | 8/1998 |
| WO | 99/27400 A2 | 6/1999 |

OTHER PUBLICATIONS

Hansen, L.V., "*Constant Frequency Condition of Fiber Lasers in Strain*", Proceedings of the 15$^{th}$ Nordic Seminar on Computational Mechanics, Aalborg, Denmark, NSCM 15, E. Lund, N. Olhoff and J. Stegmann, editors, Oct. 18-19, 2002, pp. 185-188, Aalborg University, DK, www.ime.auc.dk.nscm15.

"Location of Neutral Axis", Mechanics of Materials—Fourth Edition, James M. Gere and Stephen P. Timoshenko, Editors, 1999, pp. 311-312, Chapter 5, PWS Publishing Company, Boston, MA.

Miniscalco, William J., "*Optical and Electronic Properties of Rare Earth Ions in Glasses*", Rare-Earth-Doped Fiber Lasers and Amplifiers, Second Edition, Revised and Expanded, Edited by Michel J. F. Digonnet, 2001, pp. 17-111, Chapter 2, Marcel Dekker, Inc./Taylor & Francis Group Ltd., Oxford, UK.

* cited by examiner

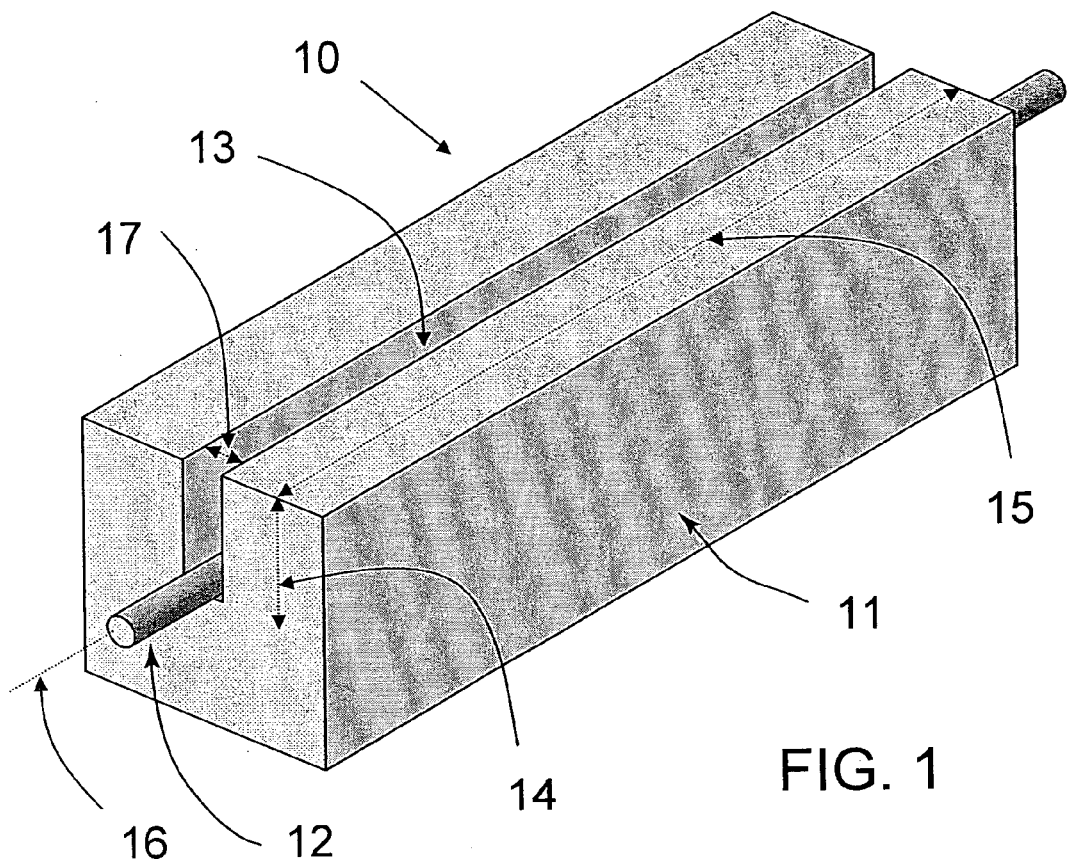
FIG. 1
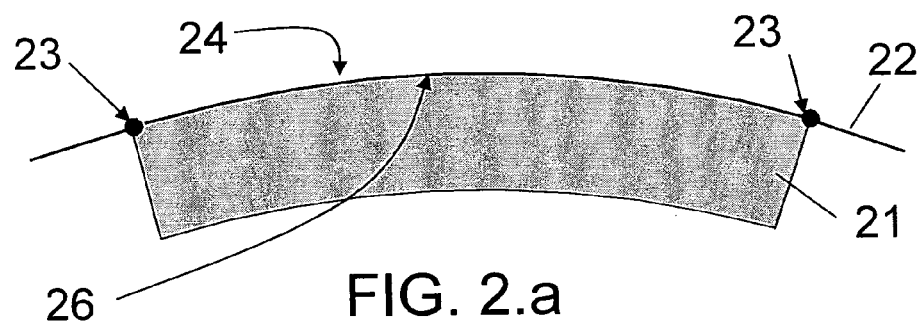
FIG. 2.a
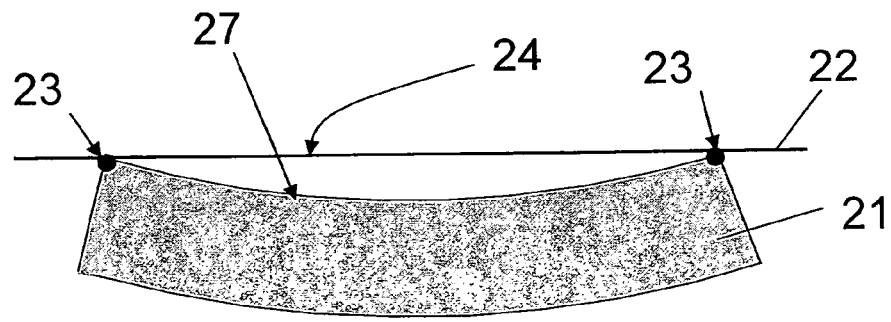
FIG. 2.b

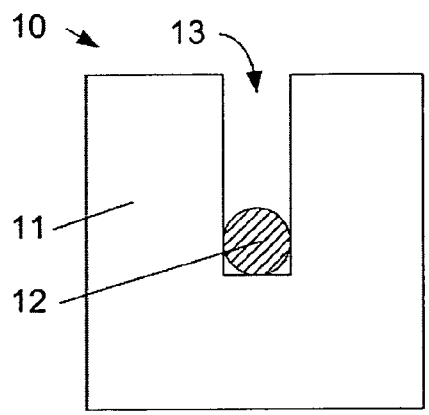
FIG. 3.a
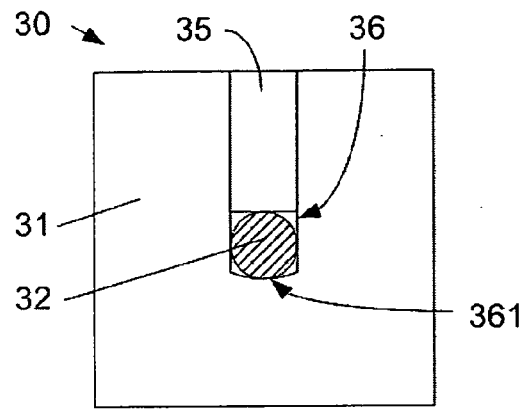
FIG. 3.b
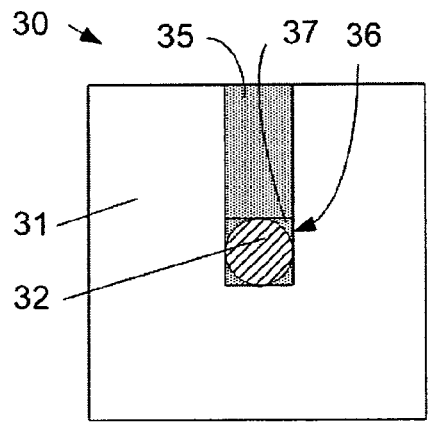
FIG. 3.c
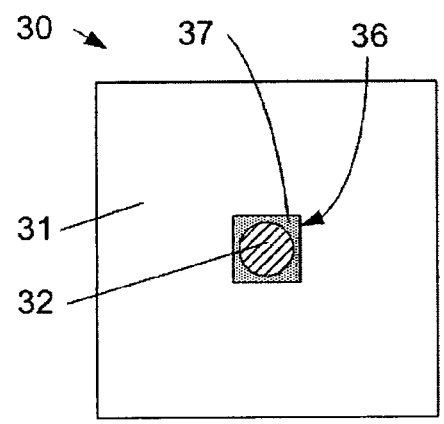
FIG. 3.d
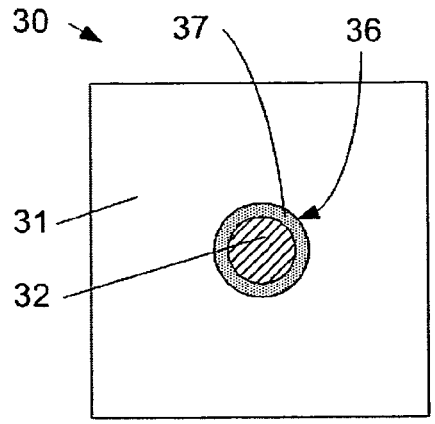
FIG. 3.e
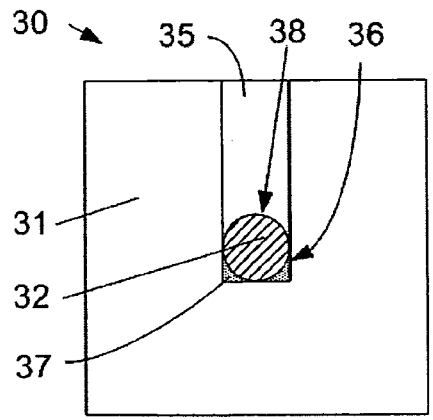
FIG. 3.f

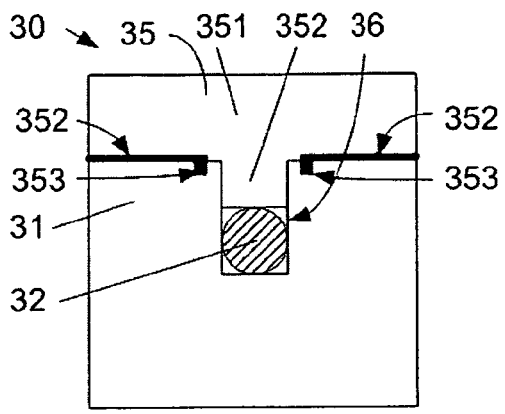
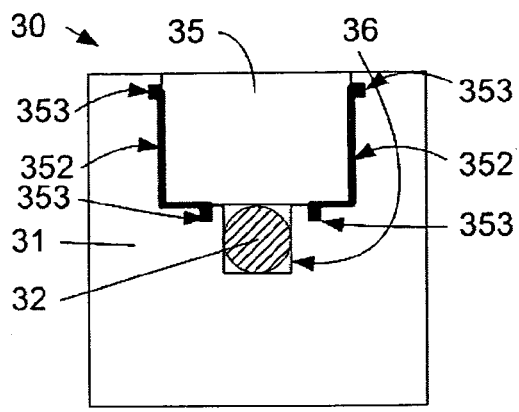
FIG. 3.g    FIG. 3.h
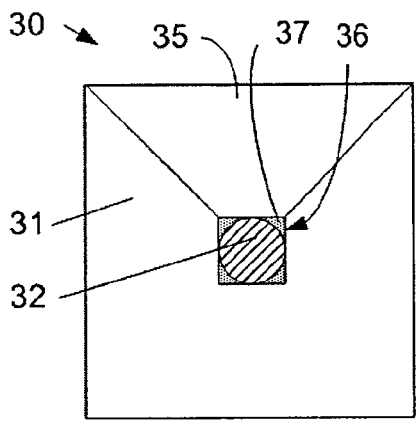
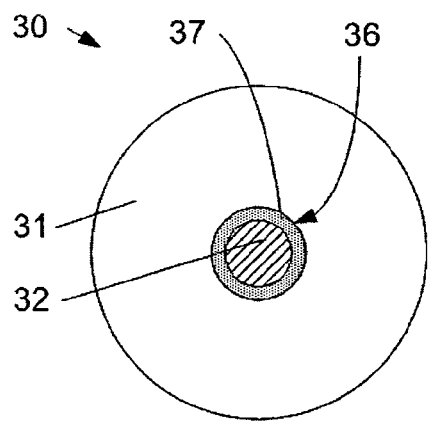
FIG. 3.i    FIG. 3.j
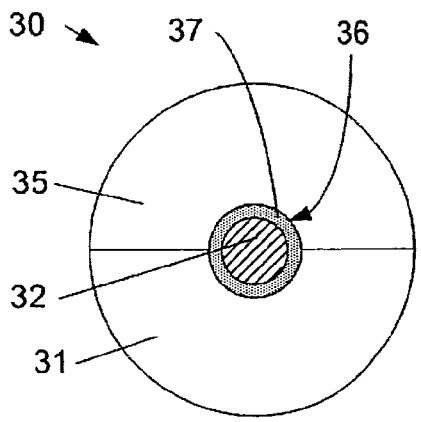
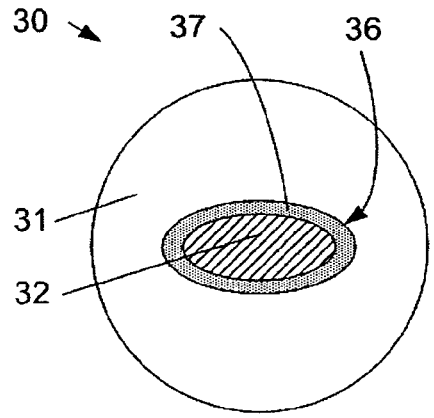
FIG. 3.k    FIG. 3.l

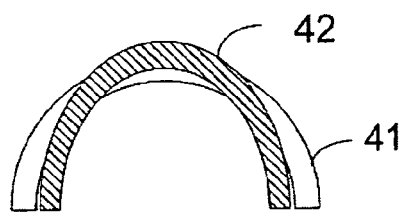
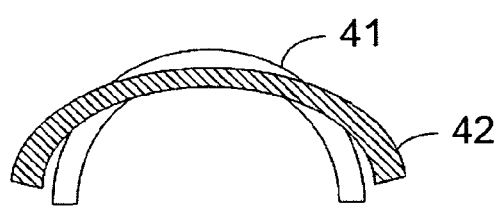
FIG. 4.a            FIG. 4.b
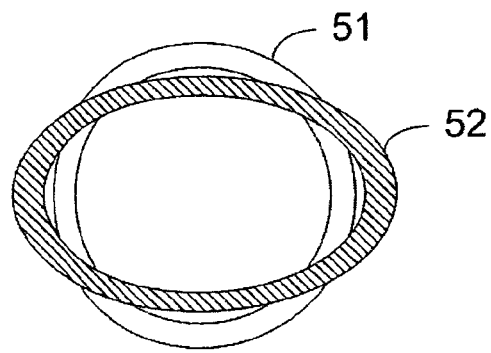
FIG. 5
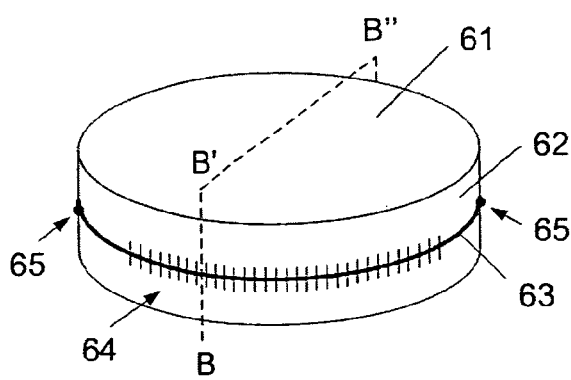
FIG. 6.a
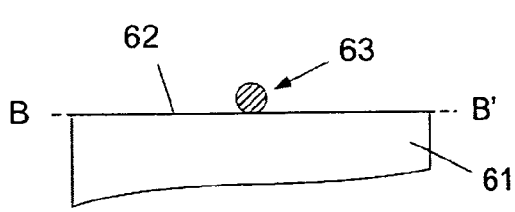
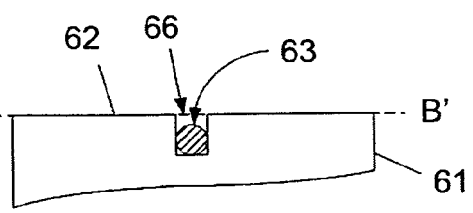
FIG. 6.b            FIG. 6.c

| | |
|---|---|
| solid circle | $K = J$<br>$J = \frac{\pi}{2}a^4$<br>$\frac{K}{J} = 1$ |
| hollow circle | $K = J$<br>$J = \frac{\pi}{2}(a^4 - b^4)$<br>$\frac{K}{J} = 1$ |
| solid square | $K = \frac{1}{6}a^4 0.844$<br>$J = \frac{1}{6}a^4$<br>$\frac{K}{J} = 0.844$ |
| thin walled circle | $K = J$<br>$J = 2\pi a^3 t$<br>$\frac{K}{J} = 1$ |
| open thin walled circle | $K = \frac{2}{3}\pi r t^3$<br>$J = 2\pi a^3 t$<br>$\frac{K}{J} = \frac{1}{3}(\frac{t}{a})^2$ |
| thin walled square | $K = 8a^3 t$<br>$J = (10 + \frac{2}{3})a^3 t$<br>$\frac{K}{J} = \frac{3}{4}$ |
| open thin walled square | $K = \frac{8}{3}at^3$<br>$J = (10 + \frac{2}{3})a^3 t$<br>$\frac{K}{J} = \frac{1}{4}(\frac{t}{a})^2$ |

FIG. 7

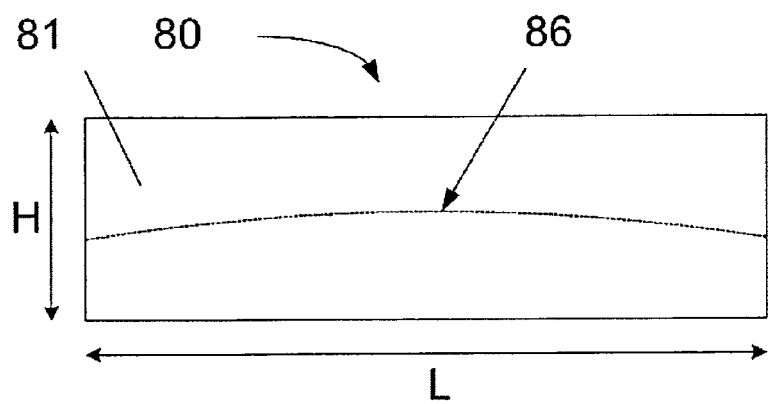
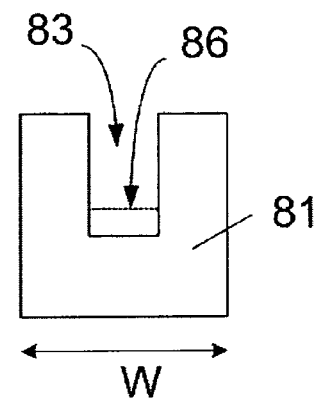
FIG. 8.a          FIG. 8.b
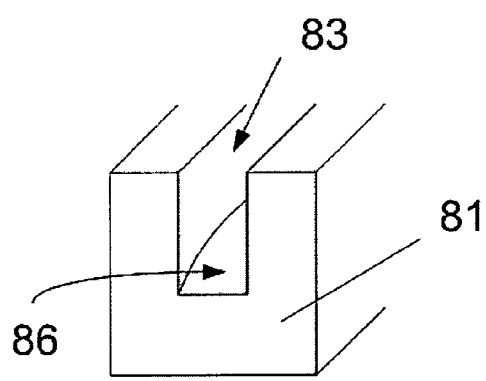
FIG. 8.c

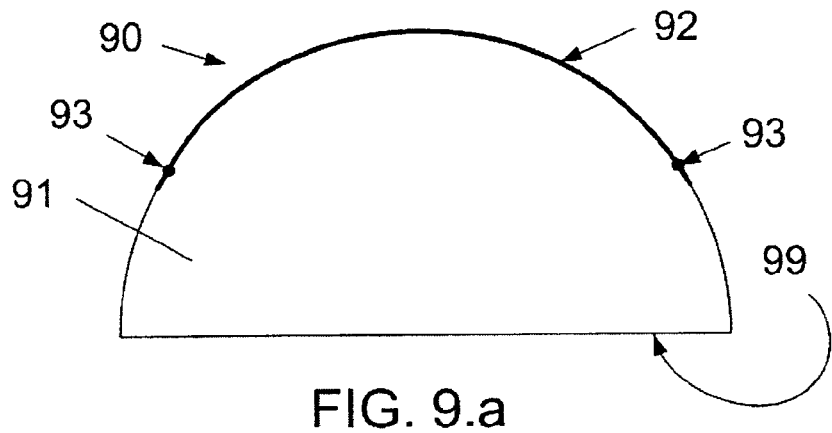
FIG. 9.a
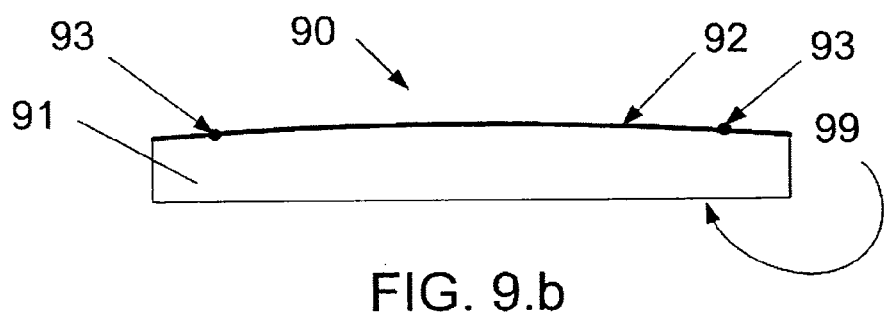
FIG. 9.b
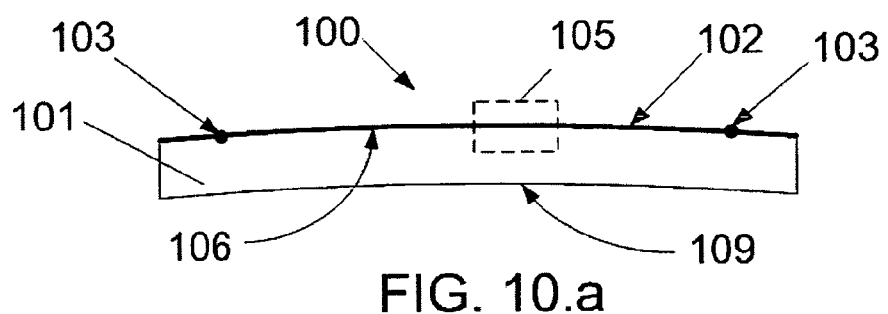
FIG. 10.a
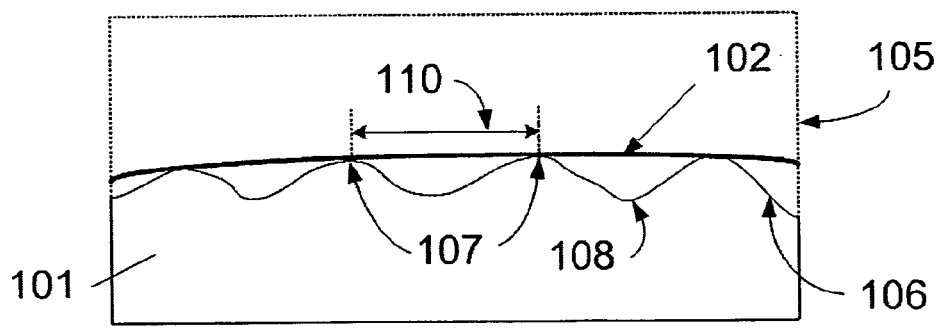
FIG. 10.b

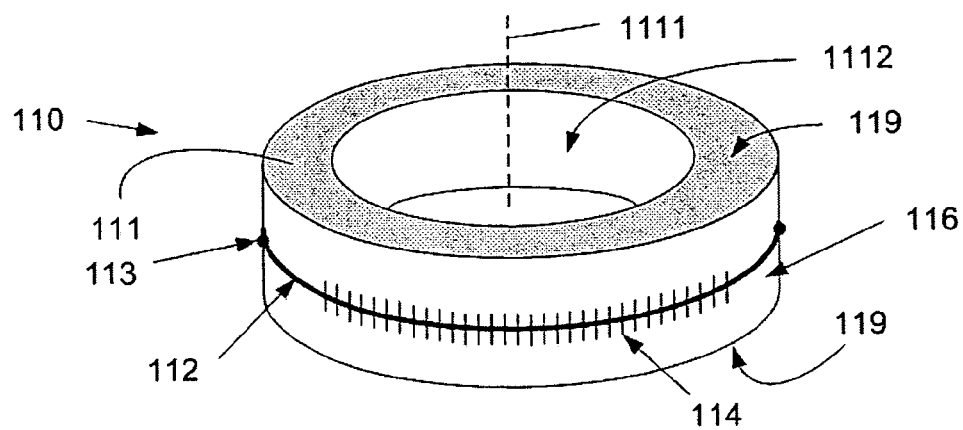
FIG. 11.a
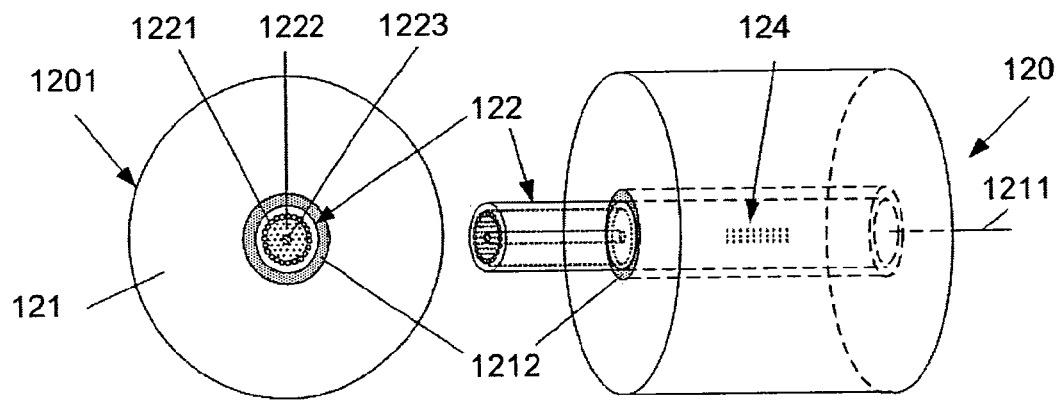
FIG. 11.b
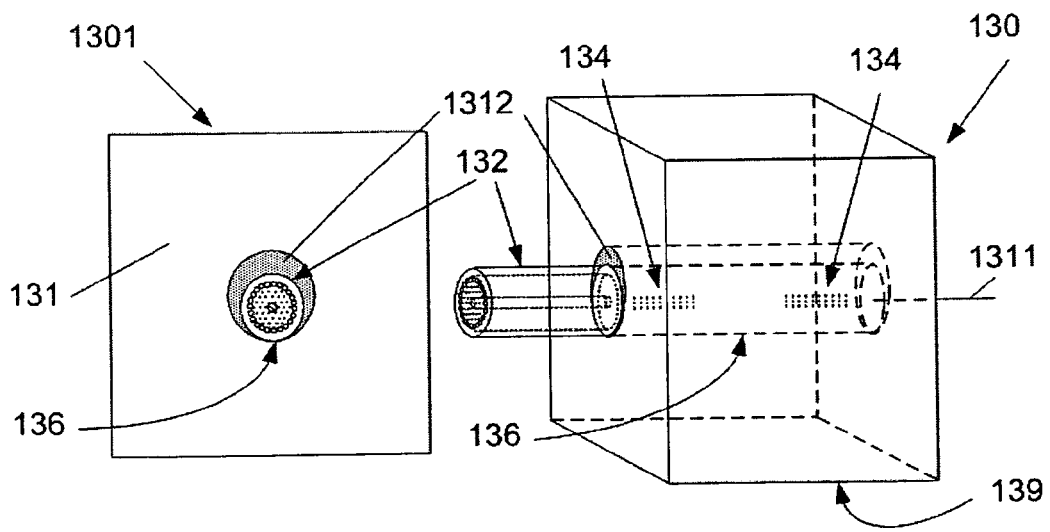
FIG. 11.c

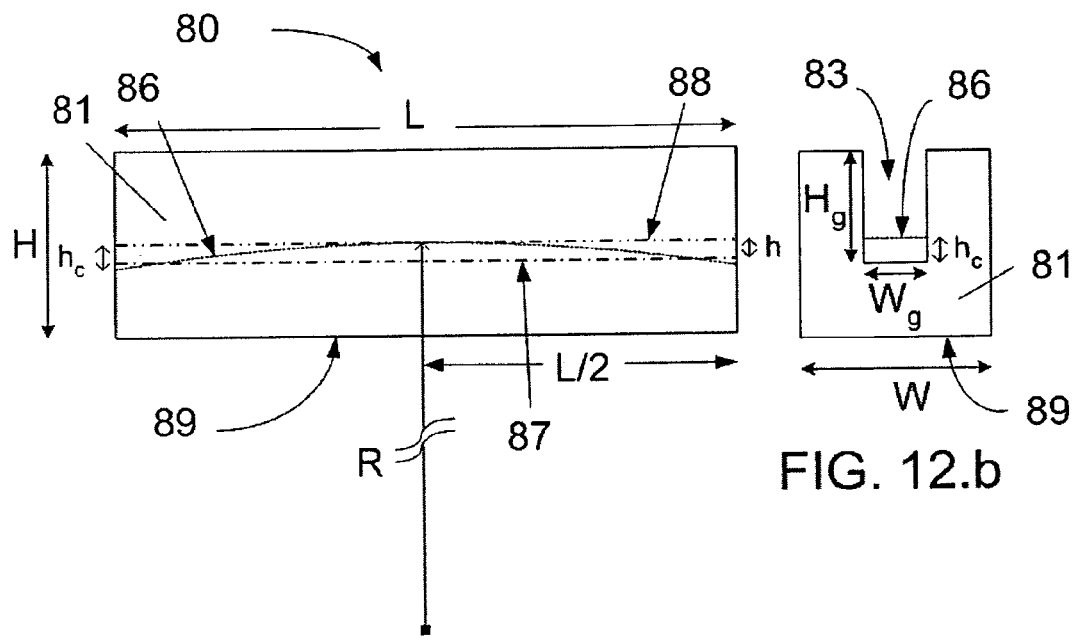
FIG. 12.a
FIG. 12.b
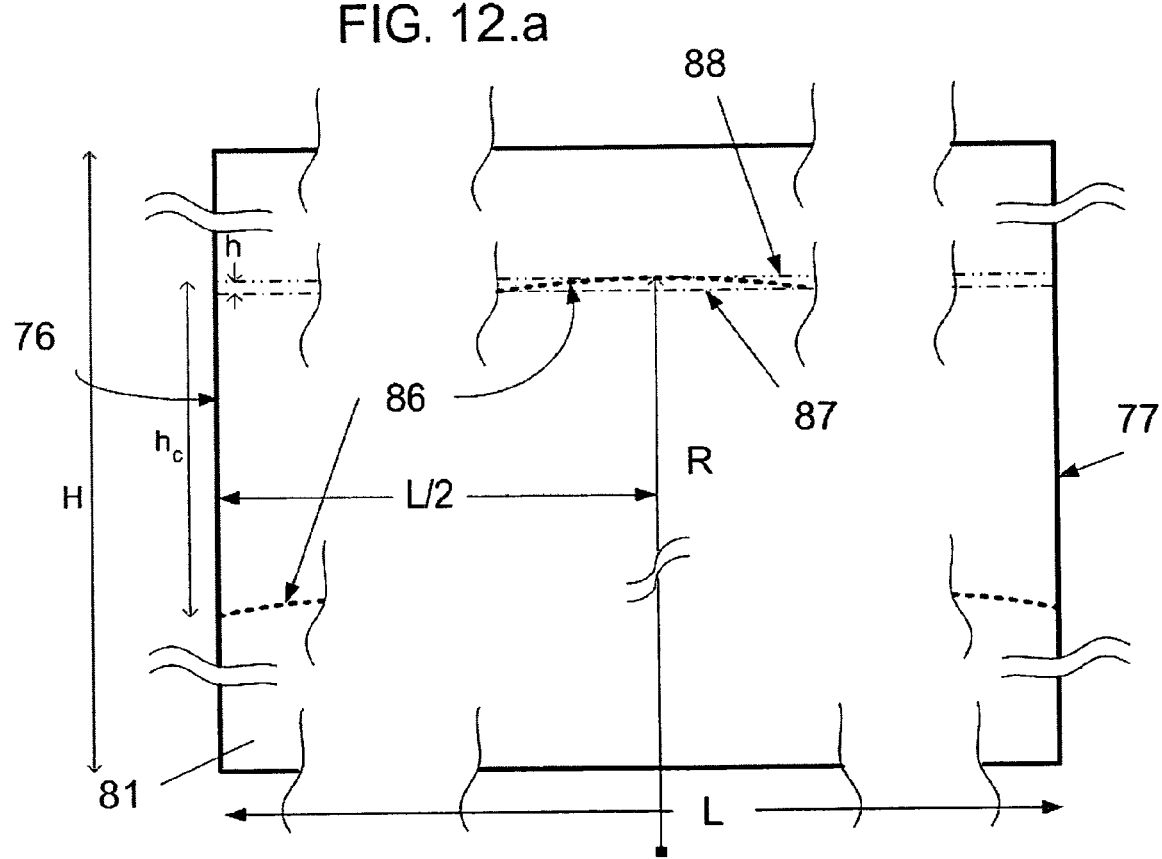
FIG. 12.c

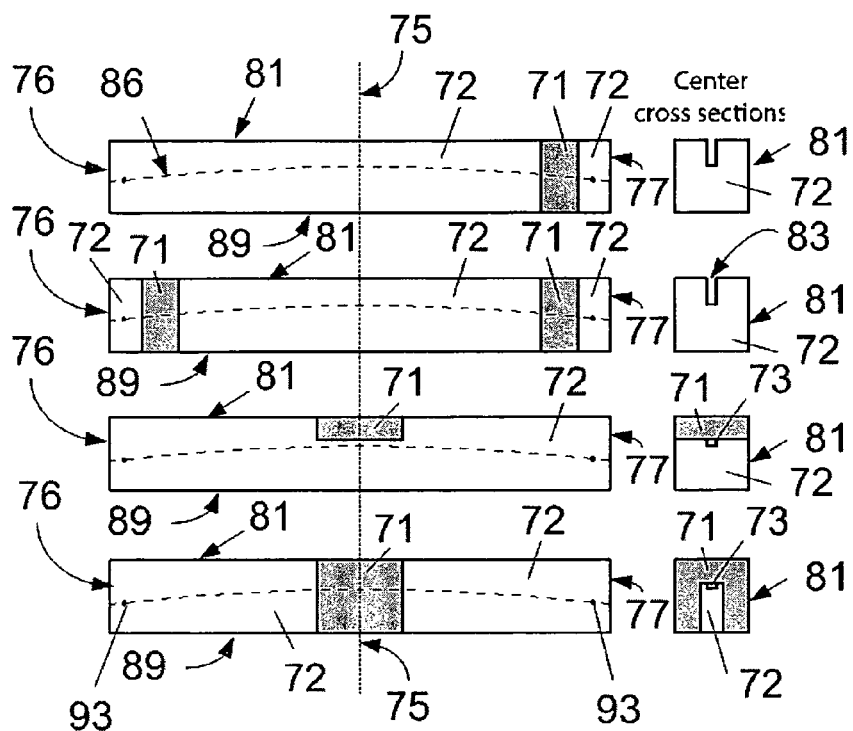
FIG. 13.a
FIG. 13.b
FIG. 13.c
FIG. 13.d

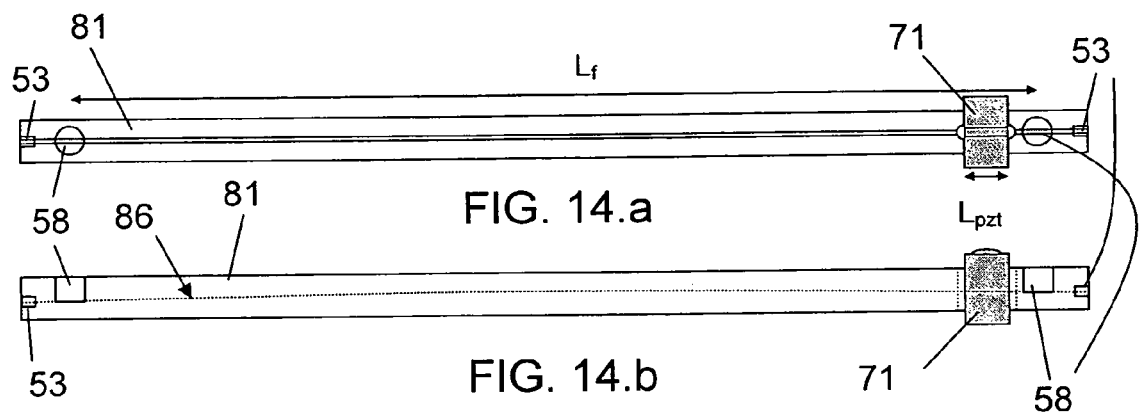
FIG. 14.a
FIG. 14.b
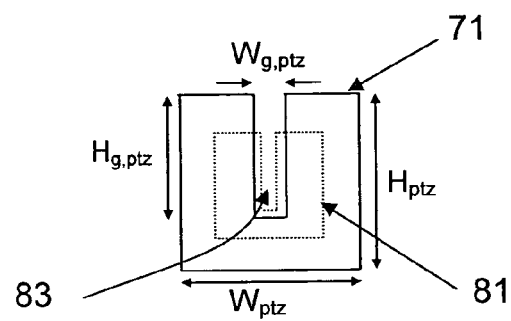
FIG. 14.c

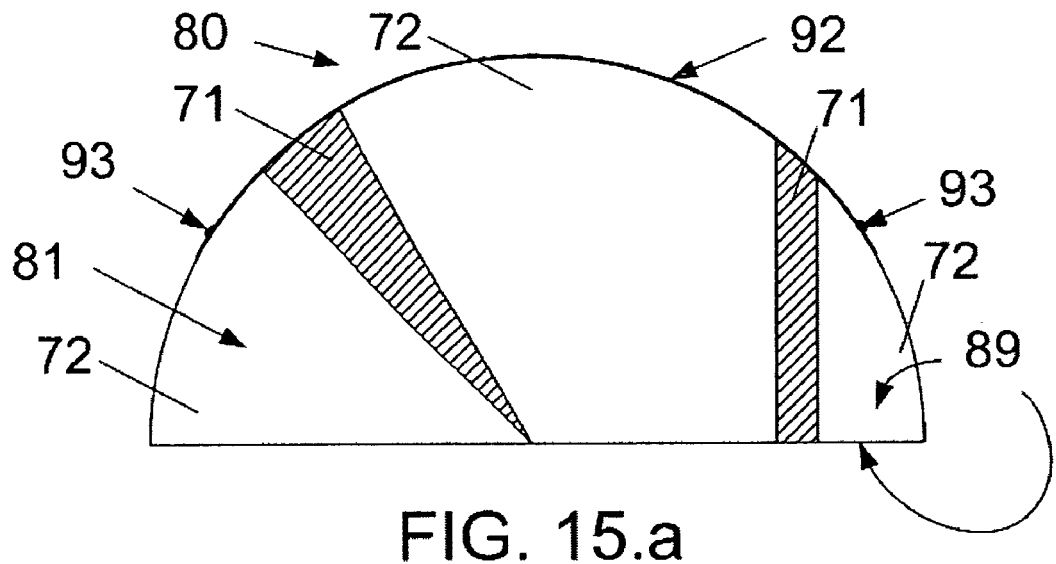
FIG. 15.a
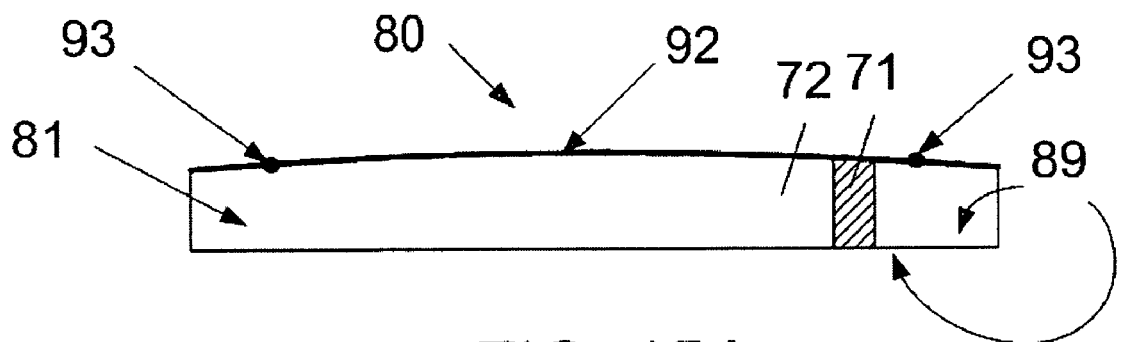
FIG. 15.b
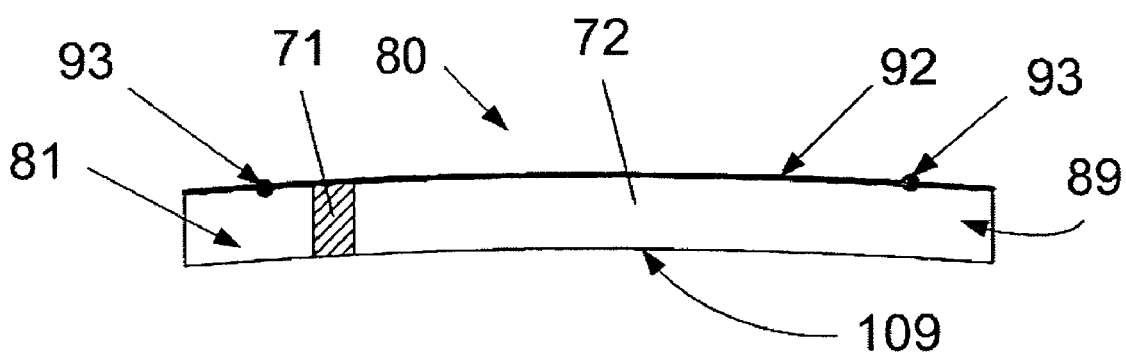
FIG. 15.c

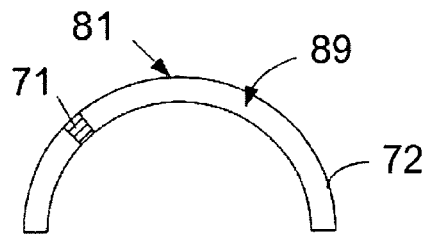
FIG. 15.d
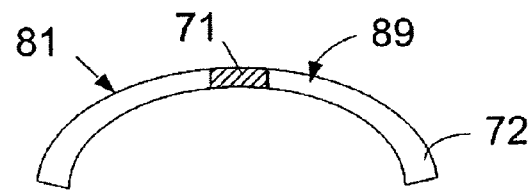
FIG. 15.e
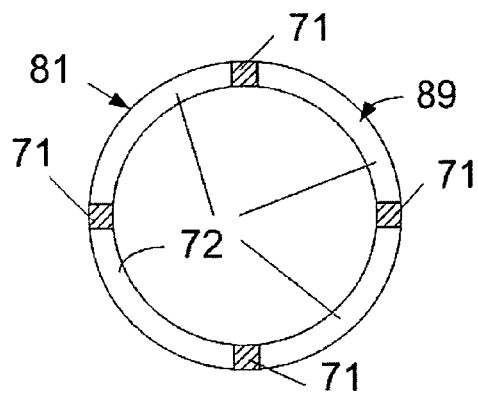
FIG. 15.f
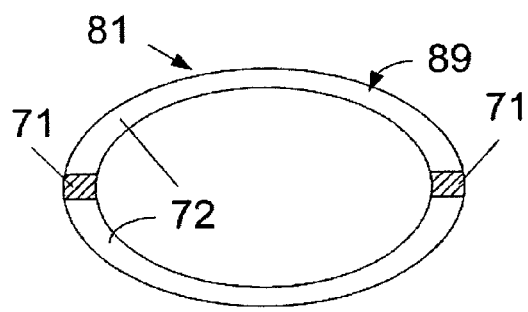
FIG. 15.g
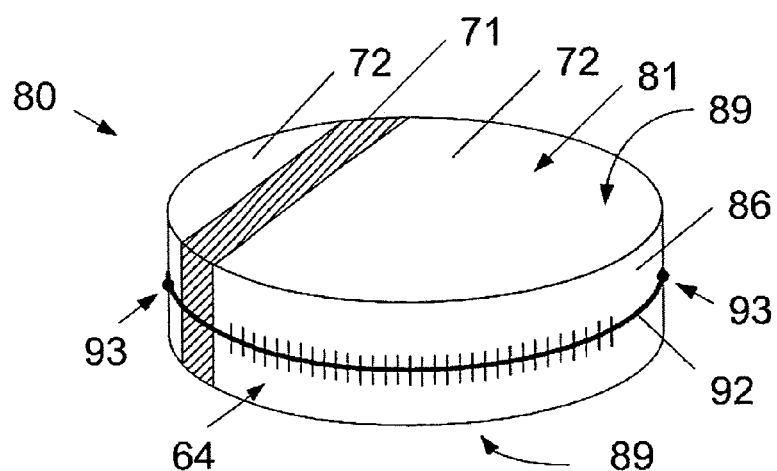
FIG. 15.h

ARTICLES COMPRISING AN OPTICAL FIBRE WITH A FIBRE BRAGG GRATING AND METHODS OF THEIR PRODUCTION

TECHNICAL FIELD

The present invention relates to the packaging of optically active optical fibres comprising fibre Bragg gratings, such as fibre lasers, in particular to the placement of the optical fibre in the package so that the sensitivity to mechanical vibrations is minimized. It further relates to the tuning of the wavelength selectivity of a fibre Bragg grating, e.g. for tuning the laser wavelength of fibre lasers.

The invention relates specifically to an article comprising a length of an optical fibre for a laser and a package, the optical fibre comprising a fibre Bragg grating dispersed over a FBG-section of the length of the optical fibre. The invention furthermore relates to an apparatus comprising such an article, to the use of the article and to a method of its manufacturing.

The invention may e.g. be useful in applications such as fibre lasers for sensing, (low frequency/phase noise fibre lasers) in wavelength tuneable fibre lasers, and in packaging of fibre lasers in general.

BACKGROUND ART

The following account of the prior art relates to one of the areas of application of the present invention, fibre lasers comprising fibre Bragg grating(s) such as optical fibre distributed Bragg reflector (DBR) or distributed feedback (DFB) lasers.

Bragg-grating based optical fibre lasers such as DBR or DFB lasers are optical fibre lasers which e.g. are produced by UV-imprinting a Bragg grating into a photo sensitive optical fibre which has been doped with an optically active agent, e.g. a rare earth ion such as erbium, ytterbium, and others (cf. e.g. WO-98/36300). Typical dimensions of Bragg-grating based optical fibre lasers along the fibre axis are a few millimeters to a few centimeters.

Bragg-grating based optical fibre lasers may combine attractive features such as stable single mode operation, narrow linewidth and long coherence length, tuning capability, wavelength selection, mechanical robustness, small size, low power consumption, and insensitivity to electromagnetic interference (EMI).

For most applications, including e.g. wavelength tuning, a Bragg-grating based optical fibre laser is packaged under tension in its longitudinal direction, typically affixed to a length-controlling, preferably relatively stiff, substrate. The mechanical properties of the substrate control the length of the optical fibre laser (and may stabilise the optical fibre medium) and consequently control the centre wavelength of the optical fibre laser. The mechanical properties of the substrate have a major influence on the environmental sensitivity of the laser.

For a number of applications a further improvement in coherence length or equivalently a low frequency and/or phase noise is desirable.

The coherence length and the frequency and phase noise properties of Bragg-grating based fibre lasers are influenced negatively by environmental effects such as temperature and acoustic vibrations.

Temperature variations cause variations in the refractive index via the thermo-optic effect. In silica fibres with a thermo-optic coefficient of approximately $10^{-5}$ °C.$^{-1}$, Bragg-grating based fibre lasers exhibit a temperature sensitivity of the centre wavelength of about 0.01 nm/°C. At 1550 nm this corresponds to a frequency variation of more than 1 GHz/°C.

Although long term temperature drift can be compensated by specialised packaging techniques involving structures with negative thermal expansion coefficients as e.g. described in WO-99/27400, small and rapid temperature fluctuations cause jitter in the centre frequency corresponding to an increase in the linewidth or a reduction in the coherence length.

Another important contribution to jitter and linewidth increase comes from acoustic perturbations (or mechanical vibrations in general). The linewidth and coherence length of lasers, including single frequency rare-earth doped fibre lasers are ultimately determined by optical spontaneous emission noise, corresponding to the Shawlow-Townes limit. For rare-earth doped fibre lasers this lies in the Hz region. In practical implementations, however, environmental effects such as those mentioned above will affect the cavity stability and lead to linewidths well above the Shawlow-Townes limit. E.g. the thermo-optic effect will lead to frequency shifts of the order of $10^{-5}$ °C.$^{-1}$·ν·ΔT [Hz] where ν is the optical frequency (in Hz) and ΔT is the temperature change (in °C.). As an example, if the frequency stability is required to be better than 1 MHz at 1550 nm then the temperature fluctuations must be lower than $10^{-3}$ °C. (1 mK).

In order to stabilise the laser frequency and increase its coherence length it is thus necessary to protect it from environmental influences.

Reduction in frequency/phase noise can be obtained by mounting the fibre laser in the neutral axis of a substrate. The neutral axis of a substrate is the axis that is subjected to no strain under bending deformations. In this way, if the substrate design is correct and the fibre laser is mounted in the neutral axis, the effect of vibrational excitations of the substrate on the fibre laser will be significantly reduced (cf. e.g. Hansen, L. V., "Constant Frequency Condition of Fibre Lasers in Strain", In proceedings, NSCM 15, 15th Nordic Seminar on Computational Mechanics, Eds.: Lund, E.; Olhoff, N.; Stegmann, J., pp. 185-188, October 2002, Aalborg, Denmark, referred to as [LVH-2002] in the following).

Substrates for fibre laser packaging are typically elongated structures that can be considered as (mechanical) beams. The theory used today for simple modelling of beams was mainly developed by Jacob Bernoulli and Euler in the 18th century. Deformations of beams can be split into three parts:

bending deformations, axial deformations, and torsional deformations.

For long beams with a large aspect ratio (i.e. the ratio between length and cross sectional dimensions), deformations due to bending are at least an order of magnitude larger than the axial and torsional deformations. Thus, in addressing methods to suppress acoustic coupling, only bending needs to be considered to first order. In pure bending, one side of the substrate will be in compression, while the other side will be in tension. A neutral axis where the deformation is zero exists between these extremes. If the fibre laser is placed on this neutral axis, bending of the package has no effect: no strain is applied to the fibre laser, hence the frequency is left unchanged, and noise from external vibrations is reduced. The exact location within the substrate of this neutral axis depends on the cross sectional geometry and is determined from Bernoulli-Euler beam theory (cf. e.g. the section "Location of Neutral Axis" on page 311-312 in J. M. Gere and S. P. Timoshenko, "Mechanics of Materials", Fourth SI Edition, Stanley Thornes (Publishers) Ltd., 1999, the book being referred to elsewhere in the application as [Timoshenko]). This theory places the neutral axis in the position where the first moment of the area of the cross section, S, is zero:

$$S = \int_A y \cdot dA = 0$$

Existing substrates/packages have therefore been developed to reduce the sensitivity to both temperature variations and acoustic vibrations. The present application deals with package designs reducing the effect of acoustic vibrations. Variations in temperature are usually slow and therefore controllable by a heat source/sink element.

Typically, the fibre is mounted on the package under tension but only fixed (e.g. with glue) at each end of the laser (cf. e.g. WO-99/27400). The centre part of the fibre laser can therefore loose contact with (in the following termed 'escape') the surface of the package, due to the fibre pre-strain. The effect is illustrated in FIG. 2.b. This effect is undesirable in the case where the laser is placed along a neutral axis of the package. In this case escaping will result in a shortening of the laser cavity length and/or the grating period and consequently in a shift of the lasing frequency.

It can, however, be problematic to fix an optical fibre comprising a fibre Bragg grating to the neutral axis of a package without changing the properties of the fibre. Fixing the fibre with glue along the length of the fibre may damage the fine Bragg-gratings in the core of the fibre, because of non-uniform hardening of the glue. The glue hardening process produces a strain-field in the fibre. The non-uniform strain field destroys the periodicity of the Bragg-grating(s), and the article (e.g. a fibre laser) of which it forms part no longer functions as intended.

It is therefore of interest to provide a scheme for mounting a fibre (e.g. comprising a fibre laser) in a package that overcomes the above problems.

As indicated in the discussion above, out of the three deformations of beams (bending deformations, axial deformations, and torsional deformations), only bending needs to be considered to first order. However, to further improve phase noise in fibre lasers to match required standards in some demanding sensor applications (e.g. use in noisy environments such as aircraft and ships), it becomes necessary to also include/reduce effects of torsional deformations.

In some DFB fiber laser applications a tuning of the frequency/wavelength of the DFB fiber lasers is needed. Existing packages/substrates either use thermal expansion of the package or a package design where the whole package is made of piezo-ceramic material. Due to the relatively high thermal expansion coefficient of Aluminum (about $23*10^{-6}$ $C.^{-1}$) a large wavelength tuning can be obtained by heating or cooling the Aluminum packages. However, the lasing frequency/wavelength can only be slowly modulated by thermal expansion. In some applications where fast modulation is desirable, piezo-ceramic material can be used. When charged electrically, a very fast modulation (in the kHz region) can be obtained by the piezo-ceramic material. However, compared to temperature tuning, only a small frequency/wavelength change is obtainable. When the whole package is made of piezo-ceramic material only a small thermal tuning can be obtained due to its relative low thermal expansion coefficient (about $1-5*10^{-6}$ $C.^{-1}$). There is thus a need for a package with improved tuning options.

U.S. Pat. No. 4,795,226 describes a length of a passive optical fibre with a diffraction grating accommodated in a curved groove of a support block structure. The purpose of the mounting is to provide an appropriate means of polishing away a controllable part of the fibre in a longitudinal direction. The use of the polished fibre is for a device for sensing variable deformations in the fibre (i.e. the aim is to make the grating as sensitive as possible to vibrations from the environment).

U.S. Pat. No. 6,240,220 describes a tunable optical fibre package comprising a curved support member for accommodating a passive optical fiber in channel and piezo electric segments for varying the tension within a fibre Bragg grating to a controlled strain thereby controlling the characteristic wavelength of the grating. The purpose of the package is to vary the wavelength response of the grating according to need. A relatively large tuning is aimed at implying a relatively small radius of curvature of the support member.

US-2002/0131709 describes a device comprising a tunable fibre Bragg grating. A passive optical fibre comprising a fibre Bragg grating is mounted on a substrate that is adapted to be bent by the application of a force perpendicular to the length of the fibre, thereby increasing or decreasing the radius of curvature of the fibre comprising the grating and thus tuning the grating wavelength. The aim of the invention is to make the device as sensitive to the change of radius of curvature as possible to increase the tuning range of the grating.

US-2002/0181908 describes a package for a fibre laser wherein the fibre laser is placed in a tube of a suitably stiff material that has been preshaped to fit into a a suitable size box. The ends are sealed with a suitable glue and the laser in the tube is positioned in the box surrounded by a curable viscous substance.

DISCLOSURE OF INVENTION

The present application generally deals with various aspects of bending and torsional deformations of acoustic origin (or due to other mechanical vibrations, such as structural vibrations) in articles comprising an optical fibre with a fibre Bragg grating and a corresponding carrier package—with the aim of controlling the sensitivity of the article to said deformations. For typical applications of such articles, e.g. as a fibre laser used to monitor acoustical phenomena (e.g. in the form of a sensitive microphone), it is of interest to reduce the sensitivity of the article to 'non-signal' acoustic vibrations from the environment in the 20 Hz-20 kHz range or in the 'sub-acoustic' range from 0.1 to 20 Hz. In other words, it is of interest to dislocate a first resonance frequency of the package outside (e.g. above) this range.

In the present application, the terms 'resonance frequency', 'natural frequency' and 'eigen-frequency' are used interchangeably in connection with characteristic excitable vibrations of a carrier or package.

In general, mechanical vibrations may be divided in acoustic and structural vibrations. Acoustic vibrations may e.g. be air borne, structure borne or propagated sub-sea. Structural vibrations that are not acoustically induced may typically have their origin in a machine or engine. In the present application, dealing with mechanical vibrations induced in an article comprising an optical fibre with a fibre Bragg grating and a corresponding carrier package, the term acoustic vibrations is used to cover all types of mechanical vibrations within the acoustic frequency range of typically 0 to 20 kHz.

The present application deals with fibre laser packages reducing the sensitivity to mechanical vibrations, where a fibre laser comprising a fibre Bragg grating is fixed to a convex surface (at least over a part of the fibre comprising the fibre Bragg grating). A further reduction of the sensitivity is obtained be aligning the convex surface with the neutral axis of the fibre laser package. An example of such a package is a half-circular package using a U-groove cross-section (cf. FIG. 9.a combined with a cross section of FIG. 3, e.g. FIGS. 3.a, 3.c, 3.f, 3.g, 3.h, 3.i). However, curved packages are more difficult to manufacture and to incorporate into applications than straight packages (because such applications typically comprise planar surfaces for supporting and optically and/or electrically connecting various components of a system or device). An elongate package with straight outer surfaces and a convex curved fibre laser carrier surface is also presented in the present application (cf. FIG. 8). The curve form and the exact location of the carrier surface in the package may be an object of optimization, which is also dealt with in the present application.

It is an object of the present invention to provide an article comprising an optical fibre with a fibre Bragg grating and a package for carrying the optical fibre which has a relatively low sensitivity to acoustic vibrations from the environment.

It is a further object to provide an article with relatively low sensitivity to bending deformation due to acoustic vibrations.

It is a further object to provide an article with relatively low sensitivity to torsional deformation due to acoustic vibrations.

It is also an object of the invention to provide a method of manufacturing such an article.

It is a further object of the present invention to provide an optical fibre laser which exhibits a reduced phase noise.

It is a further object of the present invention to provide a method of producing such an optical fibre laser.

It is a further object to provide an apparatus comprising an article according to the invention and the use of an article according to the invention.

It is a further object of the present invention to seek to provide an optimized package comprising an elongate carrier with a convex carrier surface for supporting an optical fibre comprising a fibre Bragg grating.

It is a further object of the invention to seek to provide a package with improved tuning possibilities.

Further objects appear from the description elsewhere.

The objects of the invention may be achieved by embodiments of the invention described in the accompanying claims and as described in the following.

An Article:

The present invention provides an article comprising a length of an optical fibre for a fibre laser and a package, the optical fibre comprising a fibre Bragg grating dispersed over a FBG-section of the length of the optical fibre, the package comprising a carrier with a carrier surface adapted for supporting at least a supported part of the optical fibre including the FBG-section, the supported part of the optical fibre being mounted on the carrier surface and fixed to the carrier surface on each side of said FBG-section of the optical fibre to provide a longitudinal tension in the supported part of the optical fibre during use of the article, and wherein the carrier surface is adapted to remain convex during use of the article.

The term 'an article' is in the present application taken to mean a system or product or component. An article comprising an optical fibre with a fibre Bragg grating may comprise other parts to form an optical system, e.g. a fibre laser product or a system comprising a fibre laser, etc. The article may, on the other hand, also consist only of an optical fibre with one or more Bragg gratings and its package.

The term 'an optical fibre for a fibre laser' is taken to mean an optical fibre comprising an optically active region, e.g. a region comprising optically active ions, such as rare earth ions, such as Er, Yb, Dy, Tb, Tm, etc. The sensitivity of a fibre Bragg grating located in a fibre laser is orders of magnitude more sensitive to mechanical vibrations from the environment compared to a fibre Bragg grating in a passive optical fibre. Therefore the issue of protecting an optical fibre for a fibre laser comprising a fibre Bragg grating located in a package against acoustic noise from the environment—which is a major subject of the present invention—is very much more urgent and totally different from that for a passive optical fibre comprising a fibre Bragg grating.

In an embodiment, the supported part of the optical fibre comprises the fibre Bragg grating (i.e. the FBG-section of the optical fibre) and an optically active region. In an embodiment, the fibre Bragg grating and the optically active region together form part of a laser cavity. In an embodiment, the fibre Bragg grating is located in the active region (i.e. the FBG-section of the optical fibre comprises the fibre Bragg grating as well as all or a part of an optically active region). In an embodiment, a laser cavity comprises at least two fibre Bragg gratings spatially separated by an optically active region. In an embodiment, the elements of the laser cavity are located in the supported part of the optical fibre.

In an embodiment of the invention, the fibre Bragg grating is located outside the optically active region. In an embodiment, the fibre Bragg grating is located in an optically passive optical fibre (i.e. an optical fibre wherein the concentration of optically active material is below a level sufficient for amplifying the optical signal) that is optically connected (e.g. spliced or glued or abutted, etc.) to a length of an optical fibre comprising the active region. In an embodiment, the supported part of the optical fibre comprises a length of optical fibre comprising an optically active region, which at both ends is optically connected to a piece of an optically passive fibre, each piece of optically passive fibre comprising a fibre Bragg grating, the assembly together forming a DBR-laser.

The term 'package' is in the present application taken to mean the structural parts that allow the handling of the product of which the fibre is a part, i.e. it comprises at least a carrier on which the optical fibre is supported or rests. It may additionally comprise other parts, e.g. temperature controlling means (e.g. thermal tuning means, incl. athermal tuning means) or piezoelectric control means, acoustic shielding means of the package itself (e.g. comprising acoustically absorbing material), etc. In an embodiment, the package is adapted to minimize mechanical (e.g. acoustic) vibrations from the environment. The adaptation may e.g. comprise the inclusion of acoustically absorbing material surrounding the optical fibre in the package, (cf. e.g. US-2002/0181908) and includes the features of the carrier supporting the supported part of the optical fibre as described in the following.

The term 'the carrier surface being adapted for supporting . . . the optical fibre' is in the present application taken to mean that the surface is suitable for or modified to support the fibre (e.g. by having an appropriate surface smoothness, friction, adherence, etc.). The carrier may comprise a layer of another material than that of the bulk of the carrier so that the 'supported part of the optical fibre' actually has its physical contact with said layer. In such a case the layer of material between the supported part of the optical fibre and the bulk of the carrier is considered as being part of the carrier.

The supported part of the optical fibre is fixed to the carrier surface on each side of said FBG-section of the optical fibre. This has the advantage of controlling the physical path length of the enclosed part optical fibre. The fixing of the optical fibre preferably extends over as short a length of the fibre as possible necessary to achieve a secure fixing of the fibre to the carrier surface. The fixing may be done with any conventional means, e.g. glue, epoxy, soldering, mechanical fixing.

The supported part of the optical fibre is mounted on the carrier surface to provide a longitudinal tension in the optical fibre during use of the article. An advantage hereof is that a physical contact between the enclosed part of the optical fibre and the carrier surface is achieved in a simple and efficient way, whereby it is ensured that the optical fibre and the carrier behaves as one body (including vibrate together). It has the further advantage of enabling the handling of specific differences in coefficient of thermal expansion between the optical fibre and the carrier. It has the further advantage of improving thermal dissipation of heat from the optical fibre to the carrier over the enclosed part of the optical fibre.

In an embodiment, the length of the optical fibre between the fixation points on the carrier surface is less than 50 cm, such as less than 20 cm, such as less than 10 cm, such as less than 5 cm, such as less than 2 cm, such as less than 1 cm. Alternatively, the length of the optical fibre between the fixation points on the carrier surface may be longer (e.g. by winding an optical fibre several times around a cylindrical support). However, a compromise between the optical properties and the length of the fibre (cost of materials, volume taken up by the fibre, tolerances, etc.) can be made.

In an embodiment, the carrier surface is adapted to avoid local fixation along the path of contact of the supported part of the optical fibre to the carrier surface (other than the fixations on each side of the fibre Bragg grating referred to above). This may be achieved by appropriate processing of the carrier surface, e.g. ensuring a sufficiently low surface roughness (e.g. by polishing or laser ablation), the application of a lubricant, the application to the surface of a special coating, etc. In an embodiment, the carrier surface is adapted to ensure a substantially uniform axial strain in the supported part of the optical fibre between the locations of fixation to the carrier surface.

The properties and physical implementation of a Bragg grating in an optical fibre have been extensively described, cf. e.g. WO-98/36300.

The term 'the carrier surface is adapted to remain convex' is in the present application taken to mean that the carrier surface supporting the optical fibre is convex in a longitudinal direction of the optical fibre, i.e. that each point on the curve path described by the carrier surface in a cross section along the length of the surface-adapting-part of the optical fibre has a circle of curvature whose centre is located in a direction of the interior or body of the carrier (the path being e.g. curved or rounded like circle, parabola or ellipse). Worded differently: The curve path of the carrier surface along the (intended) points of contact with the supported part of the optical fibre is a continuous curve with the property that a line joining any two points on it extends into the interior or body of the carrier.

In a particular embodiment, a path of physical contact between the supported part of the optical fibre and the carrier surface supporting the optical fibre maintains—during use of the article—a substantially constant form and convexity. Thereby the influence of environmentally induced mechanical vibrations on the characteristic wavelength of the fibre Bragg grating is minimized.

It is to be understood that the above definition assumes a certain 'macroscopic view' of the carrier surface and the supported part of the optical fibre ('macroscopic view' being defined as neglecting unevenness in the surfaces of carrier and fibre smaller than a certain size).

In a particular embodiment, a path of physical contact between the supported part of the optical fibre and the carrier surface supporting the optical fibre is convex in a longitudinal direction of the optical fibre.

An advantage of the invention is that escaping of the supported part of the optical fibre from the carrier surface can be minimized if the fibre (e.g. in the form of a fibre laser) is placed on a surface, which remain convex through a package vibration cycle. It has surprisingly turned out, that a relatively small curvature (a relatively large radius of curvature) of the path of contact between the carrier surface and the supported part of the optical fibre causes a significant reduction of the sensitivity to mechanical vibrations from the environment.

The term 'during use of the article' is in the present application taken to mean during such use for which the article is specified, e.g. for a particular amplitude and frequency spectrum of environmental acoustic noise for a particular temperature range. In other words, the term 'the carrier surface remains convex during use' can be taken to mean that the carrier surface remains convex when deformed by such vibrations to which it is specifically designed.

In a particular embodiment, the carrier has at least one outer surface suitable for being mounted on a planar support. In an embodiment, the package has at least one outer surface suitable for being mounted on a planar support.

This has the advantage of facilitating the mounting of the article together with and possibly the connection to other optical, electronic and/or electro-optical components on a planar support e.g. to form a module or system comprising the article.

The term "suitable for being mounted on a planar support" is in the present context taken to mean that the carrier can be mounted on standard supports of the electronics and optics industry, e.g. on substrates of ceramic material, polymer material, metals, etc., including printed circuit boards. Thereby physical handling of the article and the provision of signal connections to other components and systems are facilitated.

In a particular embodiment, the carrier is elongate. The carrier being elongate is e.g. taken to mean that the carrier has one spatial dimension that is larger than the other spatial dimensions so that e.g. the carrier has a physical extension in a direction of the supported part of the optical fibre (when mounted on the carrier surface) that is larger than its physical extension in other directions (i.e. the carrier is 'beam-shaped').

The term "substantially" is intended to mean being largely but not necessary wholly that which is specified.

In an embodiment, the carrier surface is substantially semicircular when viewed in a cross section along the length of the supported part of the optical fibre. This has the advantage of providing a carrier surface that is simple and easy to manufacture. The term 'the carrier surface is substantially semicircular' is in the present application taken to mean that the curve path constituted by a path of physical contact between the supported part of the optical fibre and the carrier surface along the length of the fibre is substantially semicircular (i.e. constituting a half circle within a length and/or radial tolerance of ±20%, such as within ±10%, such as within ±5%.

In an embodiment, the path of physical contact between the supported part of the optical fibre and the carrier surface along the length of the fibre is represented by a plane (convex) curve, e.g. a part of a circle. It may, however, alternatively form any other path, e.g. a helix such as in an embodiment where the supported part of the optical fibre is helically wound on a circular cylindrical carrier surface.

In an embodiment, the carrier is symmetrical around a plane spanned by the path defined by the longitudinal extension of the optical fibre (i.e. e.g. by the path of physical contact between the supported part of the optical fibre and the carrier surface along the length of the fibre).

In an embodiment, the carrier is a closed body for which the carrier surface remains convex during use of the article. The term 'a closed body'—referring to a cross-sectional view substantially along the length of the supported part of the optical fibre—is in the present application taken to mean a solid (e.g. FIGS. 6 and 9.a or hollow (e.g. FIG. 5) body as opposed to a beam formed body (e.g. FIGS. 1, 2, 4, 9b, 10 and 11-14). This has the advantage of increasing the first fundamental resonance frequency compared to a corresponding 'hollow' or 'open' body (e.g. cylindrical with a circular cross section (closed, hollow, cf. FIG. 5) or semicircular (open, cf. FIG. 4)).

The carrier surface—in a cross-sectional view substantially along the length of the supported part of the optical fibre—may follow any convenient (e.g. linear or convex) curve path adapted to the materials of the optical fibre and the carrier (including their surface friction), the fibre Bragg grating, the characteristic wavelengths, etc.

In an embodiment, the carrier surface is a part of a cylindrical surface, preferably having a substantially elliptical or circular cross section in the longitudinal direction of the supported part of the optical fibre (cf. e.g. the embodiments of FIGS. 5, 15). This has the advantage of providing a carrier surface that is simple and easy to manufacture. It further has the advantage of providing a higher first fundamental resonance frequency compared to a corresponding 'open' body while still avoiding escaping.

In a direction along the carrier surface perpendicular to the longitudinal direction of the supported part of the optical fibre (i.e. perpendicular to the plane spanned by the path of physical contact between the supported part of the optical fibre and the carrier surface along the length of the fibre), the carrier surface may take on any convenient form, such as curved or linear. This includes the carrier surface of a possible groove made in the carrier for mounting the optical fibre (see later, e.g. 361 in FIG. 3.b).

In an embodiment, the carrier (being cylindrical so that the optical fibre is supported on a cylindrical surface) comprises a fully or partially through-going opening in a direction along an axis substantially parallel to an axis of the cylindrical carrier. A fully or partially through-going opening is here taken to mean an opening that fully or partially traverses the carrier in cross-sections substantially along the longitudinal direction of the supported part of the optical fibre when mounted on the carrier so that the supported part of the optical fibre is supported by a ring-type structure (cf. e.g. FIG. 5 or 11.a). Such a structure may be advantageous by saving material compared to a solid carrier. Further, the hollow part of the package may contain other components or structural parts, thereby providing a compact system.

In an embodiment, the (possibly cylindrical) carrier surface is part of a solid package (i.e. not comprising a through going opening in cross-sections substantially along the longitudinal direction of the supported part of the optical fibre, cf. e.g. the embodiment of FIGS. 6.a, 15.h). This has the advantage of providing a carrier surface that is simple and easy to manufacture. It further has the advantage of providing a higher first fundamental resonance frequency compared to a corresponding body with a through going opening.

In a particular embodiment of the article, the supported part of the optical fibre is located substantially along a neutral axis of said package. This has the advantage of minimizing strain during bending of the package. In this way, the effect of vibrational excitations of the substrate on the fibre laser will be significantly reduced. The neutral curve path for a given body is found as described e.g. in J. M. Gere and S. P. Timoshenko, "Mechanics of Materials", Fourth SI Edition, Stanley Thornes (Publishers) Ltd., 1999, p. 311-12, the book being referred to elsewhere in the application as [Timoshenko].

In a particular embodiment of the article, the carrier surface for supporting at least a supported part of the optical fibre is located in a groove in said carrier. This has the advantage of providing a protection of the optical fibre and a convenient means for locating the optical fibre along a predefined curve path in the carrier body. It further has the advantage of enabling a fixation in a direction perpendicular to a longitudinal axis of the optical fibre. In an embodiment, the groove comprises means for fixing the optical fibre in the groove, e.g. in the form of one or more protrusions locally narrowing the groove to fix the optical fibre or in the form of one or more indentations acting as reservoirs for fixating materials such as glue or cement. In an embodiment, local protrusions and/or indentations are located at certain intervals along the length of the groove for positioning the fibre in the groove. This may ensure that the centre axis of the optical fibre follows a particular path, e.g. a neutral path of the carrier (or package).

In a particular embodiment of the article, the groove has a rectangular cross section.

In a particular embodiment of the article, the cross sectional form of said groove is adapted to the cross sectional form of said supported part of said optical fibre. An advantage thereof is that an easy and precise (self-aligning) mounting of the optical fibre in the groove is provided. The adaptation of the cross sectional form of the groove may comprise the adjustment of the form of the groove (or a part of it, e.g. the bottom) to a form similar to that of the optical fibre (e.g. circular or elliptical, cf. e.g. 361 in FIG. 3.b). It may, however, also comprise the adjustment of the form of the groove to a form different from that of the optical fibre (e.g. triangular or rectangular, cf. e.g. FIG. 3.c), e.g. to facilitate alignment and/or to leave appropriate room around the optical fibre to a (fluid or solid) filling material.

In a particular embodiment of the article, the carrier has a substantially rectangular outer boundary when viewed in a cross section perpendicular to a longitudinal direction of said optical fibre when mounted in said groove. This has the advantage of providing a carrier that has a high ratio between the cross-sectional torsion factor and the polar moment of inertia (K/J) thereby providing the carrier with relatively high torsional natural frequencies.

In a particular embodiment of the article, the supported part of said optical fibre when located on said carrier surface is fully or partially surrounded by a filling material, preferably having a mass density of substantially the same size as said supported part of said optical fibre, such as within 100%, such as within 50%, such as within 30%, such as within 20%, such as within 10% of the mass density of said optical fibre. This has the advantage of minimizing possible shocks of the optical fibre against the walls of the groove. A further advantage is that optical fibre and the filling material behave like one body. A further advantage is that the use of a filling material reduces the requirements to the mechanical tolerances of the groove, because the filling material smooth out possible irregularities. A still further advantage is that the conditions for thermal dissipation from the optical fibre can be improved (by using a heat conductive filling material, e.g. a metal). In an embodiment, the filling material is deformable material, e.g. a thermal paste, such as a cooling paste, or a metal, e.g. Indium. In an embodiment, the filling material is a fluid, at least during its application to the groove. In an embodiment, the filling material is a liquid, at least during its application to the groove. In an embodiment, the filling material is hardened or cured after its application to increase its viscosity.

In an embodiment, the filling material is Viton® (or Hexa-fluoro-propylene-vinylidene-fluoride, from DuPont-Dow Elastomers).

In a particular embodiment of the article, the carrier comprises a through-going opening—in the longitudinal direction of the supported part of the optical fibre when mounted on the carrier—wherein said supported part of the optical fibre is located (cf. e.g. FIGS. 11.b, 11.c). This has the advantage of facilitating the design of a package with improved stiffness and a relatively high natural frequency of the lowest deformation modes.

This has the advantage of lowering the influence of torsional vibrations from acoustic sources (or other sources of mechanical vibration) in the environment compared to prior art solutions (cf. e.g. FIG. 3.*a*). It has the further advantage of increasing the stiffness or the package, thereby increasing its first frequency of resonance. By confining the optical fibre in a longitudinal cavity in the form of a through-going opening, escaping is furthermore reduced, thereby lowering the sensitivity to acoustic bending of the package.

In a particular embodiment of the article, the supported part of the optical fibre is located substantially along a shear centre path of the package thereby providing minimum elongation of the optical fibre due to torsional deformation modes. If the package is doubly symmetric, when viewed in a cross-section perpendicular to the longitudinal direction of the optical fibre when mounted in the through-going opening, i.e. having a shear centre coinciding with the neutral axis for bending, a minimum elongation of the fibre when placed along this axis for both bending and torsional deformation modes is provided.

In a particular embodiment of the article, the carrier comprises several, preferably two, cooperating bodies which—when assembled—provide said through-going opening (cf. e.g. FIG. 3.*c* or 3.*i*). This has the advantage of combining the advantages of an improved stiffness and relatively high natural frequency of the lowest deformation modes with easy handling and mounting of the optical fibre. In an embodiment, one of the bodies is constituted by a filling material. In an embodiment, the bodies are joined by means of an adhesive material, e.g. glue.

In a particular embodiment of the article, the through-going opening has a cross-sectional form adapted to the cross-sectional form of said optical fibre.

The curvature of the carrier surface may preferably be optimized with a view to minimizing bending loss in the optical fibre and chirp in the fibre Bragg grating (the latter being due to bending of the grating and friction-induced uneven deformation of the grating, respectively).

In a particular embodiment of the article, the curvature of the curve defined by the path of contact of the supported part of the optical fibre with the carrier surface is in the range 0.5 $m^{-1}$ to 200 $m^{-1}$, such as in the range from 1 $m^{-1}$ to 200 $m^{-1}$, such as in the range from 5 m–1 to 70 $m^{-1}$, such as in the range from 10 $m^{-1}$ to 50 $m^{-1}$. In a particular embodiment of the article, said curvature is in the range from 0.004 $m^{-1}$ to 200 $m^{-1}$, such as in the range from 0.004 $m^{-1}$ to 20 $m^{-1}$, such as in the range from 0.004 $m^{-1}$ to 13 $m^{-1}$, such as in the range from 0.004 $m^{-1}$ to 5 $m^{-1}$, such as in the range from 0.004 $m^{-1}$ to 2 $m^{-1}$, such as in the range from 0.004 $m^{-1}$ to 1 $m^{-1}$, such as in the range from 0.004 $m^{-1}$ to 0.7 $m^{-1}$, such as in the range from 0.004 $m^{-1}$ to 0.5 $m^{-1}$, such as in the range from 0.1 $m^{-1}$ to 50 $m^{-1}$, such as in the range from 0.2 $m^{-1}$ to 2 $m^{-1}$.

In a particular embodiment of the article, the curvature is in the range from 0.1 $m^{-1}$ to 1 $m^{-1}$.

In a particular embodiment of the article, the part of said carrier surface supporting the optical fibre has a rugged surface comprising peaks or ridges and dents or valleys wherein—when viewed in a longitudinal direction of the fibre—the distance between adjacent peaks or ridges is so small that an eigen-frequency for the optical fibre suspended between adjacent peaks or ridges is larger than 5 kHz, such as larger than 10 kHz, 20 kHz, such as larger than 25 kHz, such as larger than 30 kHz. An example of a rugged surface may be a transition between surfaces of different materials, such as e.g. a multi-body carrier comprising an externally tunable material such as a piezoelectric material.

In such a case, the term 'convex' is to be understood as 'globally convex' in that the curve path described by the surface adapting part of the optical fibre along the points of contact with the carrier surface is allowed to be piecewise linear (i.e. linear between the actual physical points of contact with the carrier surface, cf. 102 and 107 in FIG. 10.*b*).

In a particular embodiment of the article, the distance between adjacent peaks or ridges is smaller than 10 mm, such as smaller than 5 mm, such as smaller than 2 mm, such as smaller than 1 mm.

In an embodiment, the carrier surface and the surface-adapting part of the optical fibre have substantially similar surface roughness (e.g. as measured by the rms roughness being within a factor of 2 of each other, such as within a factor of 1.5, such as within a factor of 1.2).

In an embodiment, a major part of the volume of the package determining the thermal expansion of the carrier surface comprises Aluminum. This has the advantage of providing a thermally conductive carrier, a relatively cheap material and an attractive material for machine working. In embodiments, a material having a low coefficient of thermal expansion such as Invar®, or a material having a coefficient of thermal expansion similar to that of the optical fibre, are used in the carrier. In embodiments, a ceramic or a piezo-electric material may be used. By choosing the carrier material with a view to the optical fibre base material (and possibly by including the degree of pre-straining of the optical fibre), account can be taken for possible differences in temperature dependence of the respective thermal coefficients of expansion to ensure that no escaping occurs in a predetermined temperature range during operation. A large stiffness (or more precisely large K/J, I/A and E/ρ ratios (cf. formula (1a), (1b) and (1c) and discussion below) of the carrier body is advantageous.

The Use of Different Materials in the Package to Achieve Relatively Slow and/or Relatively Fast Tuning of the Wavelength Range:

In a particular embodiment of the article, the carrier comprises at least two materials. This has the advantage of providing increased design flexibility, i.e. facilitate the provision of specific properties of the carrier and package (and thus the article).

In a particular embodiment, the carrier comprises at least one second body of a material (termed material-2, see later) whose longitudinal dimension is specifically adapted to be externally modulated, e.g. by an external control signal. This has the advantage of providing a possibility to dynamically influence the properties of the carrier and package (and thus the article).

In a particular embodiment, the second body comprises a material whose longitudinal dimension is specifically adapted to be electrically modulated. Electrical modulation is relatively easily provided e.g. as a DC or AC voltage or current. It has the further advantage of being easily changed to a desired amplitude and/or repetition sequence or frequency. In a particular embodiment the electrical modulation is voltage controlled with a frequency less than 10 MHz, such as in the range from 0.1 Hz to 100 kHz, such as 20 Hz to 20 kHz. This has the advantage of providing a relatively fast modulation of the length of the carrier, thereby providing a tool for controlling the phase and frequency of the laser.

In a particular embodiment, the second body comprises piezoelectric material. This has the advantage of providing a well-established means for dynamically changing a physical dimension of a body. Alternatively, the second body may comprise an electrostrictive material such as a lead-magnesium-niobate (PMN) ceramic material or a magnetostrictive material (such as an alloy crystal of one or more of the lanthanide elements (rare earths), e.g. terbium and dysprosium, plus iron).

In an embodiment, the second body comprises a piezoceramic material.

In a particular embodiment, the piezoelectric material is selected from the group of materials comprising piezoelectric ceramic materials, such as polycrystalline ferroelectric ceramic materials, such as barium titanate and lead (plumbum) zirconate titanate (PZT) and combinations thereof. Alternatively, natural materials such as quartz, tourmaline, Rochelle salt, etc. may be used. The effect is, however, relatively small in these materials. The aforementioned developed ceramic materials have superior properties compared to the natural ones.

In a particular embodiment, the carrier comprises a first body of a material (termed material-1, see later) whose longitudinal dimension is specifically adapted to be thermally modulated. This has the advantage of providing the possibility to combine the effects of the modulation of the second body with thermal tuning of the first body, where the materials, the volume, forms and location of the first and second bodies in the carrier are specifically adapted to the desired tuning possibilities. Thermal modification of the carrier may e.g. be provided by an electrical resistor or a Peltier-element.

In an embodiment, the coefficient of thermal expansion $\alpha_{T-1}$ of the material constituting said first body in a longitudinal direction of the carrier is substantially equal to the coefficient of thermal expansion $\alpha T_2$ of the material constituting said second body.

In a particular embodiment, the coefficient of thermal expansion $\alpha_{T-1}$ of the material constituting said first body in a longitudinal direction of the carrier is substantially larger than the coefficient of thermal expansion $\alpha_{T-2}$ of the material constituting said second body, such as larger than 1.5 times $\alpha_{T-2}$, such as larger than 2 times $\alpha_{T-2}$, such as larger than 5 times $\alpha_{T-2}$. This has the advantage of providing a design parameter for optimizing the tuning between the relatively slow thermal tuning by means of the first body and the relatively fast tuning by means of the second body.

In a particular embodiment, the first body comprises a material selected from the group of materials comprising a metal, such as Al or Cu or alloys thereof, a ceramic material, and combinations thereof. In an embodiment, the carrier material may comprise a material with a positive thermal expansion coefficient (such as a metal, e.g. Al or Cu) or with a substantially zero thermal expansion coefficient (such as Invar™) or a material with a negative thermal expansion coefficient (such as a ceramic material) or combinations thereof.

In a particular embodiment, the first body constitutes the majority of the volume of said carrier.

In a particular embodiment, the second body or bodies is/are located asymmetrically with respect to a cross section of the carrier perpendicular to its longitudinal direction midway between the longitudinal ends of said carrier. In an embodiment, the second body has substantially the same cross section as the rest of the carrier, i.e. substantially continuing the cross section of the adjacent carrier sections. This has the advantage of providing a direct mechanical coupling to the optical fibre. It has the further advantage of being a relatively simple mechanical solution for which mechanical tolerances are relaxed.

In a particular embodiment, the second body or bodies is/are located symmetrically with respect to a cross section of the carrier perpendicular to its longitudinal direction midway between the longitudinal ends of said carrier. This has the advantage of providing a symmetrical strain field in the optical fibre. In an embodiment, the carrier comprises two first bodies symmetrically located in the carrier and having substantially the same cross section as the rest of the carrier, i.e. substantially continuing the cross sections of the adjacent carrier sections. In a preferred embodiment, the two first bodies are synchronously modulated.

It is emphasized that the features concerning modulation of the carrier and thus tuning of the FBG (e.g. in a laser) may be used with a package that has an even carrier surface for supporting the optical fibre containing the FBG (cf. e.g. FIG. 1) as well as a package that has a convex carrier surface. Further, the structural characteristics of the carrier in a cross section perpendicular to a longitudinal of the optical fibre when mounted on the carrier may take on any convenient form, including those indicated in FIG. 3a-3i.

Articles Comprising a Fibre Laser or Specific Fibres:

In an embodiment, the optical fibre and the fibre Bragg grating form part of a laser. Thereby a fibre laser having relatively low sensitivity to acoustic vibrations from the environment is provided, thus enabling the formation of a laser with relatively low phase noise.

In a particular embodiment, the supported part of the optical fibre comprises two spatially separated fibre Bragg gratings.

In a particular embodiment, the article comprises a DBR laser wherein said optical fibre and said fibre Bragg grating(s) form part of said DBR laser. Thereby a DBR fibre laser having relatively low sensitivity to acoustic vibrations from the environment is provided.

In a particular embodiment, the article comprises a DFB laser wherein said optical fibre and said fibre Bragg grating form part of said DFB laser. Thereby a DFB fibre laser having relatively low sensitivity to acoustic vibrations from the environment is provided.

In a particular embodiment, the optical fibre is a silica based optical fibre.

Alternatively to silica based optical fibres, any other optical material fibre system may be used, e.g. polymer, Aluminophosphate, Fluorophosphate, Fluorozirconate (ZBLAN), Phosphate, Borate, Tellurite, etc. (cf. e.g. Michel. J. F. Digonnet, "Rare-Earth-Doped Fiber Lasers and Amplifiers", $2^{nd}$ edition, 2001, Marcel Dekker, Inc., Chapter 2, p. 17-p. 112, referred to elsewhere as [Digonnet]).

In a particular embodiment, the optical fibre comprises longitudinally extending micro-structures.

In a particular embodiment, the optical fibre is a double-clad optical fibre. In an embodiment, the double-clad fibre comprises a core comprising optically active dopants (such as rare-earth ions, e.g. Er and/or Yb) and (at least) an inner and outer cladding. This has the advantage of allowing cladding pumping of the core of the optical fibre. In an embodiment of the invention, the optical fibre comprises longitudinally extending micro-structures. In an embodiment of the invention, the optical fibre is a so-called air-clad fibre comprising an outer ring of longitudinally extending air holes (e.g. located in an outer cladding region of the fibre) within which pump light can be confined. This has the advantage of providing an attractive medium for a fibre laser. In yet another embodiment, the optical fibre is a double-clad fibre, wherein the inner cladding region is a multimode waveguide.

The Location of the Carrier Surface in the Package:

A beam shaped package with straight outer surfaces and a convex curved fibre laser carrier surface may be a good compromise, even if the fibre laser cannot be aligned exactly along the neutral axis.

The term 'neutral axis' is in the present application taken to mean an axis in the structural part (typically a carrier for holding an optical fibre comprising a fibre Bragg grating), where there are relatively small strains compared to other points in the structural part when it is deformed by e.g. pure bending. The placement of such a neutral axis—assuming that the groove width $W_g$ is narrow compared to the width W of the carrier, cf. e.g. FIG. 12.b (e.g. $W_g/W<0.2$, such as <0.1)—can e.g. be determined from Bernoulli-Euler beam theory (cf. e.g. the section "Location of Neutral Axis" on page 311-312 in [Timoshenko]).

In a particular embodiment, the curve defined by the path of contact of the supported part of the optical fibre with the carrier surface is substantially part of a circle having a radius R, the carrier has a longitudinal extension L, the Bragg grating having a grating strength κ, the carrier having a neutral axis N wherein the distance h between said circle and said neutral axis in a transversal cross section midway between the longitudinal ends of the carrier is substantially equal to $(4R\kappa)^{-1}$ for κL being larger than 1. This has the advantage of providing a very low frequency shift of the laser due to mechanical vibrations.

It has surprisingly turned out that, in the mentioned approximation, the distance h is NOT dependent on the length L of the carrier.

The grating strength κ of a Bragg grating is a measure of the reflectivity per unit length (which for example for a refractive index grating is determined by the refractive index modulation) cf. e.g. chapter 5 in "Fiber Bragg Gratings", Andreas Othonos & Kyriacos Kalli (Artech House, 1999, ISBN: 0890063443).

In a particular embodiment, κL is larger than 2, such as larger than 5, such as larger than 10.

In a particular embodiment, the carrier surface is substantially part of a circular cylinder surface, the cylinder having a radius R.

In a particular embodiment, the curve defined by the path of contact of the supported part of the optical fibre with the carrier surface is substantially part of a circle having a radius R, which is located symmetrically around the centre of the carrier when viewed in a longitudinal cross section, so that the top point of the circle is located midway between the longitudinal ends of the carrier (cf. e.g. FIG. 12.a).

It has surprisingly turned out, that an optimal location of the path of contact of the supported part of the optical fibre with the carrier surface is substantially below a neutral line of the carrier (when viewed as indicated in FIGS. 11-13) and 'the path is substantially below' is understood with reference to the direction of the centre of a circle of curvature of the path of contact, as being located substantially under the horizontal line 87 representing a neutral axis of the carrier on FIG. 12.a). Actually, the central part of the curve including its 'top-point' located midway between the ends of the carrier is located slightly (such as 1-20 μm) above the neutral line. For illustrative purposes regarding the individual geometric parameters, this is not indicated on FIG. 12.a, where the path of contact on the contrary is located substantially above the line 87). A more (although not entirely) realistic mutual relationship is shown in the cut-out/blow-up of FIG. 12.c.

In a particular embodiment, the distance h between the circle and the neutral axis in a transversal cross section midway between the longitudinal ends of the carrier is substantially equal to 0. In practice, the actual distance h for a physical embodiment may be determined by a tolerance set by the machine tool used for making the carrier surface. In a current machine tool this tolerance is around 20 μm.

Further embodiments are defined in the dependent claims.

An Apparatus:

An apparatus comprising an article as described above and as defined in the accompanying claims is furthermore provided by the present invention.

The apparatus may preferably constitute or be part of a LIDAR system or an interferometric system. LIDAR is an abbreviation of Light Detection And Ranging and LIDAR systems are e.g. used for measuring or mapping range, velocity, chemical composition, vibrations and concentration, etc.). An interferometric system may e.g. be used for measuring mechanical vibrations (incl. acoustic) over long distances.

Use:

Use of an article as described above and as defined in the accompanying claims is moreover provided by the present invention. Use of the article may preferably be in a LIDAR system or in an interferometric system.

A Method:

A method of producing an article is futhermore provided, the method comprising the steps of:

(a) providing a length of an optical fibre for a laser, said optical fibre comprising a fibre Bragg grating for selection of a wavelength of light propagated in the optical fibre, the fibre Bragg grating being dispersed over a FBG-section of the length of the optical fibre, (b) providing a carrier for supporting said optical fibre, said carrier comprising:
   a carrier surface for supporting at least a supported part of said optical fibre;

(b1) adapting said carrier surface to provide that a path of physical contact between the supported part of the optical fibre and the carrier surface supporting the optical fibre is convex in a longitudinal direction of the optical fibre and is adapted to remain convex during use of the article; and (c) mounting the supported part of said optical fibre on said carrier surface including at least said FBG-section of the length of the optical fibre in such a way that it is fixed to the carrier surface on each side of said FBG-section of the optical fibre to provide a longitudinal tension in the supported part of the optical fibre during use of the article.

In a particular embodiment, the method further comprises the step of adapting the package—in particular the part of the package surrounding the carrier whereon the supported part of the optical fibre is mounted—to minimize mechanical (e.g. acoustic) vibrations from the environment.

In a particular embodiment, step (b) further comprises the step (b2) of providing that said carrier comprises at least first and second bodies of different materials.

In a particular embodiment, step (b) further comprises the step of providing that (b3) said carrier comprises a material suitable for being externally modulated in a longitudinal dimension of the carrier.

In a particular embodiment, step (b) further comprises the step (b4) of providing that said different materials comprise a first material adapted to be thermally modulated in a longitudinal direction of the carrier and a second material adapted to be externally modulated in a longitudinal direction of the carrier.

In a particular embodiment, step (b) further comprises the step (b5) of providing that the carrier comprises an outer boundary with at least one outer surface suitable for being mounted on a planar support.

In a particular embodiment, the method further comprises the steps of (d1) providing that a curve defined by the path of contact of the supported part of the optical fibre with the carrier surface is substantially part of a circle having a radius R, and that the carrier has a longitudinal extension L, (e1) providing that the Bragg grating has a grating strength κ, (f1) determining a neutral axis N of the carrier, (g1) providing that the distance h between said circle and said neutral axis in a transversal cross section midway between the longitudinal ends of the carrier is substantially equal to $(4R\kappa)^{-1}$ for κL being larger than 1, such as larger than 2, such as larger than 5, such as larger than 10.

In a particular embodiment, the step (g1) is substituted by the step (g2) of providing that the distance h between said circle and said neutral axis in a transversal cross section midway between the longitudinal ends of the carrier is substantially equal to 0.

In a particular embodiment, the method comprises one or more, preferably all, the steps of (d2) providing that a curve defined by the path of contact of the supported part of the optical fibre with the carrier surface is substantially part of a circle having a radius R, and that the carrier has a longitudinal extension L, (f2) determining a neutral axis N of the carrier, (g2) providing that the distance h between said circle and said neutral axis in a transversal cross section midway between the longitudinal ends of the carrier is substantially equal to 0, so that the curve defined by the path of contact of the supported part of the optical fibre with the carrier surface is located substantially below the neutral axis in a direction of a centre of the circle.

In a particular embodiment, step (a) further comprises the step (a1) of providing that an optically active region is formed in the supported part of the optical fibre.

In a particular embodiment, step (a1) further comprises the step (a1.1) of providing that the optically active region fully or partially overlaps with the spatial extension of the fibre Bragg grating.

In a particular embodiment, step (a1) further comprises the step (a1.2) of providing that the optically active region does not substantially overlap with the spatial extension of the fibre Bragg grating.

In a particular embodiment, step (a) further comprises the step (a2) of providing that the supported part of the optical fibre comprises at least two separate lengths of optically fibre that are optically connected—such as spliced—to each other.

In a particular embodiment, step (a2) further comprises the step (a2.1) of providing that the fibre Bragg grating is formed in a length of an optically passive optical fibre.

Features of the method have the same advantages as mentioned for the corresponding features of the article described above under the heading "An article".

Further objects of the invention are achieved by the embodiments defined in the dependent claims and in the detailed description of the invention.

It should be emphasized that the term "comprises/comprising" when used in this specification is taken to specify the presence of stated features, integers, steps or components but does not preclude the presence or addition of one or more other stated features, integers, steps, components or groups thereof.

BRIEF DESCRIPTION OF DRAWINGS

The invention will be explained more fully below in connection with a preferred embodiment and with reference to the drawings in which:

FIG. 1 shows a view of a prior art carrier with an optical fibre laser;

FIG. 2 shows a fibre laser fixed at each end to a package; two extreme cases of maximum deformation of the package over a vibration period are shown in FIGS. 2.a and 2.b, respectively;

FIG. 3.a-3.l shows a cross sectional view of different articles comprising an optical fibre mounted in a package, FIG. 3.a from the prior art and FIGS. 3.b-3.l according to the invention;

FIG. 4 shows a half circle package, FIGS. 4.a and 4.b illustrating the two cases of maximum deformation of the package over a vibration period (the fundamental eigenmodes), where the undeformed package is indicated with no filling;

FIG. 5 shows a full circle package illustrating the case of maximum deformation of the package over a vibration period (the fundamental eigenmode), where the undeformed package is indicated with no filling;

FIG. 6 shows a cylinder package, FIG. 6.a being a perspective view and FIGS. 6.b and 6.c being cross-sectional views along BB'B" illustrating two embodiments of the placement of the optical fibre on the carrier surface, respectively;

FIG. 7 shows analytical formulas and approximations of the cross sectional torsion factor K and polar moment of inertia J for different beam cross sections;

FIG. 8 shows a package according to the invention comprising a carrier substrate with a groove having a convex carrier surface, FIG. 8.a showing a cross-section along the longitudinal direction of the fibre, FIG. 8.b a transversal cross-section of a package end and FIG. 8.c a perspective end view;

FIG. 9 shows articles according to the invention with 'strongly' convex (semicircular solid, FIG. 9.a) and 'weakly' convex (FIG. 9.b) carrier surfaces;

FIG. 10 shows an article according to the invention where the carrier surface is uneven, FIG. 10.a showing the carrier in full and FIG. 10.b a blow-up of a smaller part of the carrier surface;

FIG. 11 shows various embodiments of a package according to the invention comprising a carrier substrate with a through-going opening, FIG. 11.a showing a perspective view of a cylindrical package having an outer surface with a circular cross section where on the optical fibre is mounted, FIGS. 11.b and 11.c showing cross sectional views (left) and side views (right) of a carrier substrate wherein the optical fibre is mounted in the through-going opening, the outer cross sectional shape of the carrier perpendicular to a longitudinal direction of the optical fibre when mounted on the carrier being circular (FIG. 11.b) and rectangular, such as square (FIG. 11.c), respectively.

FIG. 12 shows a more detailed view of the carrier of FIG. 8, FIG. 12.a showing a side view along the longitudinal direction of the fibre, FIG. 12.b a front view of a carrier end and FIG. 12.c a blow-up of the ends and a central part of the carrier, FIG. 13 shows examples of elongate packages comprising one or more sections of piezoelectric material according to the invention, FIG. 14 shows an example of an elongate carrier according to the invention comprising a piezoelectric part inserted near a longitudinal end of the carrier, FIG. 14.*a* being a top view, FIG. 14.*b* a side view and FIG. 14.*c* an end view, respectively, and FIG. 15 shows various examples of multibody carriers comprising at least one body of a material that is suitable for external modulation of a dimension of the body in a direction of the supported part of the optical fibre when mounted on the carrier surface.

The figures are schematic and simplified for clarity, and they just show details which are essential to the understanding of the invention, while other details are left out.

MODE(S) FOR CARRYING OUT THE INVENTION

FIG. 1 shows a view of a prior art carrier 11 with an optical fibre laser 12, cf. e.g. [LVH-2002].

Different packaging designs have been developed to reduce the effect of acoustic noise on a fibre laser's frequency. Best results have been obtained by placing the fibre laser comprising a length of optical fibre on a neutral axis 16 in a carrier 11 of the package where the deformations are small when the package is bending. An example for such a prior art package is seen on FIG. 1, where the fibre laser is placed in a groove 13 in the package. The depth of the groove is here designed such that the fibre laser is placed along the neutral axis of the package. The length 15 of the groove is larger than or equal to the length of the fibre laser. The neutral axis has been found by modelling the package as a Bernoulli-Euler beam, and only considering pure bending. In this case a neutral axis 16 exists in the package where the deformations are zero. This neutral axis is according to Bernoulli-Euler beam theory located where the first moment of area of the cross-section is zero.

In the following, the maximum elongation of a fibre with a U-groove mount (with reference to FIGS. 1 and 2) is investigated.

When the U-groove mount (or carrier) 11 is produced, tolerances are allowed to ensure a proper mounting process. A coated optical fibre typically has a 250 μm diameter. This diameter can vary both from time to time and along the length of the fibre as it normally has been recoated (e.g. after writing a Bragg grating in the fibre). Typical numbers are +/−10 μm.

It is advantageous that the optical fibre 12 can be mounted in the groove 13 without friction. Therefore, the groove is typically made with a 300-400 μm width 17 giving a tolerance of 25-75 μm on each side of the optical fibre to the side walls of the U-groove (cf. FIG. 1). Not all of the cross sections of FIG. 3 do indicate this tolerance, but it is implicit for embodiments having such a tolerance.

The optical fibre 12 is fixed at the ends (e.g. in each end of the groove 13) giving a typical length between the fixing points of 30 to 120 mm, often about 60 mm.

To understand the maximum frequency drift due to acceleration of the mount 11, a simple geometric consideration can be made. It is assumed the optical fibre 12 will remain in the centre of the bottom of the groove at the fixation points (e.g. 23 in FIG. 2) and touch the U-groove (side-)wall at the midpoint between the fixation points when accelerated. Furthermore, the line form of the optical fibre is approximated with a triangular function having a baseline of length L (between the fixation points) and a height h (being the maximum movement from the centre of the groove in a direction perpendicular to the longitudinal direction of the optical fibre (and the groove) at the midpoint between the fixation points of the optical fibre).

Where "h" is the distance the optical fibre can move from the centre to the edge of the U-groove and L is the length between the fixation points the length increment "dl" can be expressed as:

$$dl = 2 \cdot \sqrt{\left(\frac{L}{2}\right)^2 + h^2} - L = L \cdot \sqrt{1 + 4 \cdot \left(\frac{h}{L}\right)^2} - 1$$

Since h/L<<1 this can be reduced to $$dl = 1/2 \cdot \left(4 \cdot \left(\frac{h}{L}\right)^2\right) \cdot L = 2 \cdot \frac{h^2}{L}$$

For L=60 mm, this gives a length increment of 0.02 μm to 0.33 μm for a 25-75 μm tolerance in the U-groove.

To further calculate what this leads to in frequency, the following expression can be used $$\frac{dl}{L} \cdot (1 - p_e) = \frac{df}{f} \Rightarrow df = \frac{dl}{L} \cdot (1 - p_e) \cdot f = 2 \cdot \left(\frac{h}{L}\right)^2 \cdot (1 - p_e) \cdot f$$

where $p_e$ is the elasto-optical coefficient (app. 0.21 for a silica fibre, cf. e.g. WO-99/27400) and f is the optical frequency (app. 193 THz) at λ=1550 nm.

The frequency drift relating to the length increment is then about 50-500 MHz (e.g. 52 MHz for h=25 μm and 474 MHz for h=75 μm).

The typical frequency drift of a free running fibre laser is about 1 MHz/s and a typical fibre laser spectral line width is 1 kHz. Comparing this with possible frequency drift related from acceleration, this illustrates that acceleration (e.g. from induced mechanical vibrations) can have a substantial effect on the spectral performance of the fibre laser.

The force that is needed to dislocate the fibre a distance "h" perpendicular to the longitudinal direction of the fibre in the centre between its fixation points can be approximately expressed by $$F = 2 * T * (h/L)$$

where T is the tension in the fibre given in [N].

As an example, for L=60 mm, T=0.22 N, and h=25 μm, a force F=183 μN is determined. Forces perpendicular to the fibre axis may e.g. be generated by acoustic or other mechanical vibrations or direct acceleration of the package.

To improve the acceleration the mount can handle without leading to a frequency drift at least two things can be done.

1) Include a material between the optical fibre and the U-groove wall. This will dampen the movement of the optical fibre during acceleration. If the density of the material is equal to the density of the optical fibre a substantial damping can be achieved. It is advantageous to choose a material that does not stress the optical fibre leading to chirp effects in the fibre Bragg grating degrading the laser performance.

2) Include a pre-tension between the optical fibre and the mount. This can be achieved by mounting the optical fibre over a convex carrier surface. For a given predefined insensitivity to acceleration, a necessary pre-tension can be calculated given the convex curvature and the tension.

An approximate expression for the maximum acceleration Acc ensuring that the optical fibre does not escape the surface of the carrier may be formulated:

$$Acc < T/(\rho_L * r)$$

where r is the radius of curvature of the carrier surface. Examples are shown in the table below for $\rho_L = 9.8175 \cdot 10^{-5}$ kg/m (silica fibre), and T=0.22 N:

|  | Radius r [m] | | | |
| --- | --- | --- | --- | --- |
|  | 1 | 10 | 100 | 228 |
| Acceleration Acc [m/s²] | 2240 | 224 | 22.4 | 9.82 |
| Amplitude of corresponding sinusoidal vibration @ 1000 Hz [μm] | 56 | 5.6 | 0.56 | 0.25 |

This shows that for even large radii of curvature, the 'escape' acceleration becomes relatively large. E.g. for a radius of curvature of 1 m, an acceleration of more than 200 times the acceleration due to gravity (g~10 m/s²) is needed, making the laser relatively insensitive to mechanical vibrations compared to prior art solutions. Further, if r<228 m the package may be placed anywhere in the gravitational field of the earth, e.g. having the optical fibre turning downwards (i.e. in the direction of the gravitational force) without the fibre escaping the convex carrier surface (if no other forces influence the package). Dynamic accelerations put a further limitation on the radius, where e.g. shock impacts can give very large accelerations, and a smaller radius is therefore desirable (the actual radius of curvature being determined with a view to the optical properties of the fibre laser).

FIG. 2 shows a fibre laser fixed at each end to a longitudinally shaped package. Two extreme cases of maximum deformation of the carrier 21 of a package over a vibration period are shown in FIGS. 2.a and 2.b, respectively. The fibre 24 is mounted on the carrier under tension but only fixed (e.g. with glue) at each end 23 of the fibre. In FIG. 2.a, illustrating one extreme bending mode the fibre 24 follows the convex carrier surface 26. In the opposite extreme of the bending mode (FIG. 2.b), the centre part of the fibre can, however, loose contact with (escape) the surface of the carrier, due to the fibre prestrain. The effect is illustrated in FIG. 2.b wherein the fibre 24 has escaped the concave surface 27. The unintended change of length (reduction) of the optical fibre, including the fibre Bragg grating unintentionally changes the optical properties of the fibre (e.g. the wavelength selection of the fibre Bragg grating).

However, besides bending, other deformation modes such as axial and torsional deformations also effect the acoustic sensitivity negatively. Usually the axial deformations are only a problem for high frequency acoustic noise. But effects from torsional deformations can be observed for mid range acoustic noise when effects from bending is reduced using packages where the laser is placed on a neutral axis. For this reason it is here examined how packages can be designed such that both bending and torsional deformation modes effect the fibre laser as little as possible.

The following strategies are advantageously used to reduce deformations of a fibre laser fixed to a stiff, elongated package when excited by acoustic noise or other mechanical vibrations:

Fix the laser at positions on the package such that elongation of the laser is as small as possible when the package is excited in problematic deformation modes.

Increase the natural frequency of the lowest deformation modes such that overall deformation for the mode is reduced for low frequency acoustic noise.

Ensure good physical contact between fibre and package (avoid escaping).

It is advantageous to reduce the overall deformation by increasing the natural frequency—even if it is possible to find an axis where the laser is undeformed in a given mode, because the laser has a radius larger than zero (i.e. the radially outer parts of the fibre will not be located on a neutral axis or path). Further, it may in some cases prove difficult in practice to place the fibre exactly on the given neutral axis.

Conventional fibre laser packages are usually long compared to the cross-sectional area and therefore here considered as 'beams'. The natural frequencies of long beams with a large ratio between length and cross-sectional area (i.e. e.g. L>10*D or L>20*D, where L is the length of the fibre laser and D a representative cross sectional dimension of the optical fibre, e.g. its diameter, however designs having smaller L/D-ratios may show similar effects, e.g. L>5*D) can be approximated as:

$$\omega_i^2 = \gamma_i^4 \frac{1}{l^4} \frac{E}{\rho} \frac{I}{A} \quad \text{Bending} \tag{1a}$$

$$\omega_i^2 = \gamma_i^2 \frac{1}{l^2} \frac{G}{\rho} \frac{K}{J} \quad \text{Torsional} \tag{1b}$$

$$\omega_i^2 = \gamma_i^2 \frac{1}{l^2} \frac{E}{\rho} \quad \text{Longitudinal} \tag{1c}$$

where depending parameters can by grouped into: The material parameters, density $\rho$, Young's modulus E and shear modules $G=E/(2(1+v))$, where v is Poisson's ration. The geometric parameters, cross-sectional area A, length l, moment of inertia I, polar moment of inertia J and the cross-sectional torsion factor K. The constants $\gamma_i$ depend on the mounting of the package. For a free-free mounting (i.e. encapsulated in a soft acoustic damping material, e.g. a foam) the first of these are given in the table below.

| i | $\gamma_i$ bending | $\gamma_i$ torsional | $\gamma_i$ longitudinal |
| --- | --- | --- | --- |
| 1 | 4.73004 | π | π |
| 2 | 7.85320 | 2π | 2π |
| 3 | 10.9956 | 3π | 3π |
| 4 | 14.1372 | 4π | 4π |

For long beams, the natural frequencies of the bending modes are typically lower than the corresponding torsional and longitudinal modes, the actual mutual relative position of the frequencies being dependent on the geometry of the beams in question. From (1) it is seen that the natural frequencies increase if the package length l is decreased or if a material with a high stiffness to mass ratio (E/ρ or G/ρ) is used. The natural frequencies of bending and torsional modes also depend on the cross-sectional design. Cross-sections with a high ratio between moment of inertia and area (I/A) increase the bending natural frequencies, and similarly a high ratio between the cross-sectional torsion factor and the polar moment of inertia (K/J) increases the torsional natural frequencies.

The cross-sectional torsion factor K is defined from:

$$M = GK(\phi/l)$$

where M is the moment required at both ends to twist a rod or beam of length l the angle φ. GK is known as the torsional stiffness factor, which is the product of the material depending shear modulus G and the cross-sectional torsion factor K.

Analytical formulas and approximations of K exist for specific types of cross-sections. Some examples are shown in FIG. 7. But generally analytical solutions exist only for circular and thin walled cross-sections. Circular cross-sections have a cross-sectional torsion factor equal to the polar moment of inertia J of the cross-section:

$$J = \int r^2 dA$$

In this case the ratio K/J is one and has maximum value.

But even if analytical expressions can not be setup for a general cross-section, some suggestions for maximizing the ratio K/J may be given on the basis of the simplified cross-sections in the table above:

Use a circular cross-section, if possible, having a maximal K/J ratio and torsional natural frequency.

Do not use an open cross-section, this reduces the torsional stiffness significantly compared to a closed cross-section.

Use a doubly symmetric cross-section, having a shear centre coinciding with the neutral axis for bending. This provides minimum elongation of the fibre laser when placed along this axis for both bending and torsional deformation modes.

A circular cross-section with a small hole in the centre for placement of the fibre laser is the most optimal cross-section. But a package with a square cross-section can be more easy to produce and handle. The package with a groove designed to reduce fibre laser elongation when the package is subjected to bending (cf. FIG. 3.a) should be modified to increase its torsional performance. By closing the groove (cf. FIG. 3.b), a higher torsional stiffness and K/J ratio can be obtained. If the hole remaining is square and placed at the centre of the cross-section, it is doubly symmetric and has coinciding neutral axis and shear axis (also at the centre). A comparison between a package with a groove (FIG. 3.a) and a closed package (FIG. 3.b) is disclosed in Example A below.

FIG. 3 shows a cross sectional view of different articles 10, 30 comprising an optical fibre 12, 32 (e.g. forming part of a fibre laser) mounted in a package (here shown as a carrier 11, 31 (for one-body carriers) or carrier 31, 35 for two-body carriers).

FIG. 3.a illustrates a cross-section of the prior art package of FIG. 1 with an optical fibre 12 mounted in a groove 13, e.g. on a neutral axis of the package (cf. 16 in FIG. 1). Please note, that the cross-section of FIG. 3.a is NOT prior art when used in connection with embodiments of FIG. 4, 5, 8, 9 or equivalent.

FIGS. 3.b-3.l shows different embodiments of packages according to the present invention. The centre line of the optical fibre preferably coincides with a neutral axis of the package.

FIG. 3.b shows a two-body package with a first U-formed carrier body 31 and a second closing body 35 adapted to cooperate with the U-formed body to form a square through-going opening or cavity 36 in the carrier for mounting an optical fibre 32 with at least one fibre Bragg grating, e.g. an optical fibre laser. Together the two bodies have a rectangular (possibly square) outer outline.

FIG. 3.c shows a two-body package as in FIG. 3.b wherein the optical fibre 32 is surrounded by a filling material 37. Further, second closing body 35 is constituted by the same or another filling material. The filling material should preferably have a mass density that is comparable in value to those of the optical fibre and the carrier material (e.g. that lies in between).

FIG. 3.d shows a one-body package with a rectangular cross section of the through-going opening or cavity 36 wherein the optical fibre 32 is surrounded by a filling material 37. The package has a rectangular (possibly square) outline.

FIG. 3.e shows a one-body package with a circular cross section of the through-going opening or cavity 36 wherein the optical fibre 32 is surrounded by a filling material 37. The package has a rectangular (possibly square) outline.

FIG. 3.f shows a two-body package as in FIG. 3.c where surface of contact 38 of the closing body 35 with the optical fibre 32 is adapted to the form of the optical fibre (and wherein the optical fibre is surrounded by a filling material 37).

FIG. 3.g shows a two-body package comprising a first U-formed carrier body 31 and a second T-formed closing body 35 (comprising horizontal member 351 and lateral member 352) adapted to cooperate with the U-formed body to form a square through-going opening or cavity 36 in the carrier for mounting an optical fibre 32. The package has a rectangular (possibly square) outline. The central 'leg' 352 of the 'T' is adapted to fit into the groove of the first U-formed carrier body 31 to form the cavity 36, thereby providing an easy to handle, self-aligning package. The two bodies 31, 35 constituting the carrier of the package are fixed to each other by glue 352. In the parts of the carrier extending in the longitudinal direction of the optical fibre 32, the glue may be added over the entire contacting surfaces between the two bodies or in one or more discrete strings of glue applied along the length of the carrier. A glue stop 353 in the form of a small groove or ditch is indicated. The purpose of the glue stop is to prevent the glue from advancing to the cavity 36 containing the optical fibre 32.

FIG. 3.h shows a two-body package comprising a first U-formed carrier body 31 and a second rectangular closing body 35 adapted to cooperate with the U-formed body to form a square through-going opening or cavity 36 in the carrier for mounting an optical fibre 32. The internal faces of the 'legs' of the U comprise a step that narrows the part of the groove that holds the optical fibre 32. The package has a rectangular (possibly square) outline. The two bodies 31, 35 constituting the carrier of the package are joined by glue 352. Glue stops 353 in the form of small grooves or ditches are indicated.

FIG. 3.i shows a two-body package comprising a first U-formed carrier body 31, the lateral 'legs' of the 'U' having inwardly sloping faces and a second trapez-formed closing body 35 adapted to cooperate with the U-formed body to form a square through-going opening or cavity 36 in the carrier for mounting an optical fibre 32, thereby providing an easy to handle, self-aligning package. The optical fibre is surrounded by a filling material 37. The package has a rectangular (possibly square) outline.

FIG. 3.j shows a one-body package of circular outline with a circular through-going opening or cavity 36 in the carrier for mounting an optical fibre 32, thereby providing an ideal cross section for proving a package with high natural frequency. The optical fibre is surrounded by a filling material 37.

FIG. 3.k shows a package as in FIG. 3.j, except that the circular cylindrical carrier 31 is formed from two bodies (two halves) 31, 35.

FIG. 3.l shows a package as in FIG. 3.j, except that the through-going opening or cavity 36 in the carrier for mounting an optical fibre and the optical fibre itself 32 have elliptical cross-sections.

FIG. 4 shows a half circle package, FIGS. 4.a and 4.b illustrating the two cases of maximum deformation of the package over a vibration period (the fundamental eigenmodes), where the undeformed package 41 is indicated with no filling.

A package formed as a half circle in its undeformed and deformed states is shown in FIG. 4. The eigenmode 42 corresponding to the fundamental resonance frequency is shown in FIGS. 4.a and 4.b, respectively. As seen in the figure the top surface remains convex even when deformed by the vibrations corresponding to the fundamental resonance frequency. Escaping from the surface is avoided by fixing the laser to the surface at each end of the package.

By making a groove in the half-circle package, it is possible to fix the laser at the neutral axis (in this case constituting a half circle). The groove depth of the cross section can be calculated in the same way as for straight packages, if the cross sectional area is small compared to the radius of the half-circle package. The cross-section of the package perpendicular to the longitudinal direction of the optical fibre may take on any convenient form, including those illustrated in FIGS. 3.a-3.l.

Instead of using a package formed as a half circle, the fundamental resonance frequency can be increased by closing the circle. A full circle package is shown in FIG. 5. The fundamental resonance frequency can thereby be increased by 45% compared to the half circle package.

FIG. 5 shows a full circle package, FIGS. 5.a and 5.b illustrating the case of maximum deformation of the package over a vibration period, the fundamental eigenmode, 52. The undeformed package 51 is indicated with no filling.

The cross-section of the package perpendicular to the longitudinal direction of the optical fibre may take on any convenient form, including those illustrated in FIGS. 3.a-3.l.

FIG. 6 shows a cylinder package, FIG. 6.a being a perspective view and FIGS. 6.b and 6.c being cross-sectional views along BB'B" illustrating two embodiments of the placement of the optical fibre 63 on the carrier surface 62 and in a groove 66, respectively. The optical fibre 63 comprise a fibre Bragg grating 64 located between fix points 63 of the optical fiber to the carrier surface 62.

A package formed as a cylinder has a very high fundamental resonance frequency. A preferable, exemplary package may be an aluminum cylinder with diameter 44.6 mm and a height of 20 mm.

The fundamental resonance frequency is 35 kHz, far above the acoustic region (0 Hz to 20 kHz).

FIG. 8 shows an article 80 according to the invention comprising an elongate (beam shaped) package having (at least one, here all) planar outer surfaces (appropriate for mounting on a planar support) with a carrier 81 of length L, width W and height H with a groove 83 having a convex carrier surface 86, FIG. 8.a showing a side view along the longitudinal direction of the fibre, FIG. 8.b a front view of a package, and FIG. 8.c a perspective end view. The convex carrier surface 86 is adapted for mounting an optical fibre (e.g. an optical fibre laser) affixed at each end under longitudinal tension.

The cross-section of the package perpendicular to the longitudinal direction of the optical fibre (i.e. the cross section illustrated in FIG. 8.b) may take on any convenient form, including those illustrated in FIGS. 3.a-3.i (including embodiments omitting the second closing body 35 of the two-body packages), while still maintaining the convex 'longitudinal' form of the carrier surface.

FIG. 9 shows articles 90 according to the invention with carriers 91 having 'strongly' convex (semicircular solid, FIG. 9.a) and 'weakly' convex (FIG. 9.b) carrier surfaces where an optical fibre 92 is affixed to the carrier surface at points 93 on each side of at least one fibre Bragg grating in the optical fibre.

Both embodiments are shown to have substantially planar carrier faces 99 opposite the carrier surface adapted for supporting the optical fibre. This has the advantage of easing the placement or mounting of the package in a system environment comprising planar objects (such as most conventional electro-optical system assemblies).

The optical fibre may or may not be located in a groove. In case the fibre 92 is located in a groove, the shown convex shape of the carrier surface is taken to be the shape of the carrier surface in the groove bottom where physical contact between carrier and fibre is present.

Preferred embodiments of the invention are further illustrated by the following examples.

EXAMPLE A

"Two Body Package with Cavity Closing Body. Comparison of Package with U-Groove and Closed Groove"

A package with a centre groove and one with a centre (through-going) hole is compared (cf. e.g. FIGS. 3.a and 3.b). Both packages have the outer dimensions of 5 mm×5 mm×70 mm, and are made of aluminum (E=70 GPa, v=0.34, ρ=2700). The groove has a depth of 2.65 mm and a width of 0.3 mm. The centre hole is a 0.3 mm×0.3 mm square. The cross-sectional constants for the two packages are given in the table below.

|  | $I_{xx}$ | $I_{yy}$ | J | K | K/J |
| --- | --- | --- | --- | --- | --- |
| Groove | 50.5 mm$^4$ | 52.1 mm$^4$ | 103 mm$^4$ | 43 mm$^4$ | 0.418 |
| Hole | 52.1 mm$^4$ | 52.1 mm$^4$ | 104 mm$^4$ | 88 mm$^4$ | 0.843 |

The cross-sectional constants are calculated using the finite element program ANSYS (a commercially available software based on the finite element method, available from ANSYS, Inc., Canonsburg, Pa. 15317, U.S.A.). It is possible to calculate the moments of inertia analytically, but the cross-sectional torsion factor K can generally only be calculated using numerical methods. The first natural frequencies ($\omega_1$) are calculated with (1a)-(1c):

|  | Bending | Torsional | Longitudinal |
| --- | --- | --- | --- |
| Groove | 5.34 kHz | 14.4 kHz | 36.4 kHz |
| Hole | 5.43 kHz | 20.4 kHz | 36.4 kHz |
| Circular | — | 22.2 kHz | 36.4 kHz |

Both the lowest bending and the torsional natural frequency have been increased by closing the groove. Because of the double symmetry of the closed cross-section, the neutral axis and the shear centre coincide in the centre hole (cf. e.g. p. 421 in [Timoshenko]). This reduces elongation of the fibre laser when the laser is placed on these axes and subjected to bending or torsion. However, the elongation of any axis in a package subjected to torsional deformations is already small, but by placement in the shear centre, the laser remains located on a line instead of deforming to a helix. Even if elongation of the laser can be neglected when placed in the shear centre and on the neutral axis, twisting of fibre lasers can not be avoided when the package is subject to torsional deformation. Twisting of the fibre gives shear strains in the fibre which affect the optical media indirectly through the photo-elastic effect rotating the principal axes of the anisotropic optical fibre media. But this effect is reduced by moving the torsional natural frequencies away from (in this case up) from the incoming acoustic noise frequencies.

EXAMPLE B

"A Package with an Irregular but Substantially Convex Carrier Surface"

This example deals with an embodiment of the invention in which the carrier surface is macroscopically convex but irregular in the sense that the carrier surface comprises peaks and dents or ridges and valleys, so that the surface adapting part of the optical fibre is supported by (e.g. physically rests on) peaks or ridges but does not have physical contact with dents or valleys in the surface.

FIG. 10 shows such an article 100 where the surface 106 of the carrier 101 is uneven.

FIG. 10.a shows the carrier 101 in full with optical fibre 102 being mounted on the convex surface 106 under tension by means of soldering or glue points 103. The bottom surface 109 (opposite the carrier surface 106 used for supporting the optical fibre 102) is convex and has a shape substantially identical to that or carrier surface 106.

FIG. 10.b shows a blow-up of a smaller part 105 of the carrier surface 106. The uneven character of the carrier surface 106 appears, illustrated by peaks 107 and dents 108. The maximum distance L 110 between two adjacent peaks in the longitudinal direction of the surface-adapting part of the optical fibre 102 is indicated. Appropriate values for L are calculated for an illustrative example below.

Eigen-frequencies of a vibrating string are given by the following expression (boundary condition: fixed-fixed, like a guitar string):

$$f_n = \frac{n}{2L}\sqrt{\frac{T}{\rho_L}}$$

where $f_n$ are the eigenfrequencies [Hz], n=1, 2, 3, ..., L is the length of the string [m], T is the tension in the string given in [N], and $\rho_L$ is the linear mass density (mass per unit length) of the string [kg/m] (cf. Chapter 2: "Transverse motion: The Vibrating String", page 52 in Kinsler, L. E.; Frey, A. R.; Coppens A. B.; Sanders, J. V.: "Fundamentals of Acoustics", 4th Edition, 2000, John Wiley & Sons, Inc.).

Typical parameters for an optical fibre with a silica glass core and a PVC coating:

$\rho_L$=2600 kg/m$^3$*π/4*(125 μm)$^2$+1800 kg/m$^3$*π/4* ((250 μm)$^2$−(125 μm)$^2$) =9.8175·10$^{-5}$ kg/m

|  | T[N] | L[m] | n | $f_n$ [Hz] |
| --- | --- | --- | --- | --- |
| Ex 1 | 1 | 1 · 10$^{-2}$ | 1 | 5046 |
| Ex 2 | 1 | 0.25 · 10$^{-3}$ | 1 | 20185 |
| Ex 3 | 0.22 | 1 · 10$^{-2}$ | 1 | 2367 |
| Ex 4 | 0.22 | 1.1 · 10$^{-3}$ | 1 | 21517 |

Ex 3 and 4: The tension in the string of T=0.22 N represents the smallest pre-strain of the optical fibre resulting in a wavelength change of 0.3 nm relative to λ=1550 nm.

Conclusion (of Example B): The distance between peaks or ridges in a direction of the surface-adapting part of the optical fibre should preferably be smaller than 1 mm (under the above conditions) in order to dislocate the natural frequency to a value above the acoustic range 20-20 kHz.

FIG. 11 shows various embodiments of a package according to the invention comprising a carrier substrate with a through-going opening.

FIG. 11.a shows a perspective view of a package 110 having a cylindrical carrier 111 having an outer surface 116 with a circular cross section whereon the optical fibre 112 comprising a fibre Bragg grating 114 is mounted, substantially as that of FIG. 6. Different from the embodiment of FIG. 6, the carrier of FIG. 11.a comprises a through-going opening 1112 along an axis 1111 of the cylindrical carrier. The through-going opening of the embodiment of FIG. 11.a has the purpose of saving material compared to a solid carrier. Further, the hollow part of the package may contain other components, thereby providing a compact system when the package is mounted on a planar substrate (e.g. a printed circuit board or another substrate) using one of its planar outer surfaces 119.

FIGS. 11.b and 11.c shows cross sectional views 1201, 1301 (left) and side views (right) of a package 120, 130 with a carrier substrate 121, 131 wherein the optical fibre 122, 132 is mounted in the through-going opening 1212, 1312, the outer cross sectional shape of the carrier perpendicular to a longitudinal direction 1211, 1311 of the optical fibre when mounted on the carrier being circular (FIG. 11.b) and rectangular, such as square (FIG. 11.c), respectively. The optical fibre 122, 132 may be any kind of optical fibre suitable for use as a fibre for a fibre laser, here a double clad fibre is illustrated, specifically a micros-structured fibre comprising a central core region 1223, a micro-structured inner cladding 1222 and an 'air-clad' outer cladding 1221 comprising a ring of closely spaced air holes. In the fibre 122 of FIG. 11.b a single, centrally (in a longitudinal sense) located fibre Bragg grating 124 is indicated, as is e.g. used in a DFB laser. In an embodiment, the fibre Bragg grating 124 is located in the optically active region of the DFB-laser. In the fibre 132 of FIG. 11.c, two spaced apart fibre Bragg gratings 134 are indicated, as is e.g. used in a DBR laser. The purpose of locating the optical fibre in the through-going opening is to provide a package with an improved stiffness and a relatively high natural frequency of the lowest deformation modes. In an embodiment, the DBR-laser comprises an assembly wherein the two fibre Bragg gratings 134—spatially separated by an optically active region—are each formed in a separate length of a passive optical fibre that is spliced to a length of optical fibre comprising the optically active region of the DBR-laser. Similar DFB or DBR lasers (one fibre or assembled solutions) may be implemented with any of the other embodiments of the present invention. The cross sectional dimensions perpendicular to a longitudinal direction 1211, 1311 of the optical fibre are exaggerated compared to those of the longitudinal directions. The convex form of the carrier surface for supporting the optical fibre is not indicated. The package 130 and carrier 131 of the embodiment of FIG. 11.c is especially suited for mounting on a planar substrate due to its planar outer surfaces 139. A further difference between the embodiments of FIGS. 11.b and 11.c is that the optical fibre 132 comprising the fibre Bragg grating(s) 134 in FIG. 11.c is supported by the carrier surface of the opening directly (not as indicated in FIG. 11.b where a filling material may surround the optical fibre 122 and fills out the space of the opening around the fibre or spacers in the opening hold the fibre in a substantially central position in the opening).

FIG. 12 is identical to FIG. 8 apart from the indication in FIG. 12 of certain constructional parameters. In FIG. 12, the radius of curvature R of the convex carrier surface 86 (here a circular cylinder surface) is indicated. The maximum distance h between a neutral axis 87 of the package and the carrier surface 86 is further indicated. The height $H_g$ and width $W_g$ of groove 83 in a cross section perpendicular to the longitudinal axis of the carrier 81 are further indicated in FIG. 12.*b*. The carrier 81 has at least one substantially planar outer surface 89 suitable for being mounted on a substantially planar support (such as a substrate whereon other optical, electronic and/or electro-optical components can be mounted and possibly connected to form a module). In the longitudinal cross section of FIG. 12.*a*, the maximum height $h_c$ of the circular carrier surface over its level at the longitudinal ends (cf. 76, 77 in FIG. 13) for a symmetrically disposed circle of radius R is indicated (cf. indication of 'L' and 'L/2' in FIG. 12.*c*). A formula for calculating $h_c$ is given in EXAMPLE 4 below. A blow-up of the ends and a central part of the carrier is shown in FIG. 12.*c*. The ratio of h to $h_c$ is typically in the range from 0.01 to 0.05.

The location of the neutral axis of a given package, if considered as a beam, is discussed e.g. in [Timoshenko], p. 311-12.

In the following EXAMPLE 1 and 2, approximate expressions of h are setup to minimize the sensitivity of the article 80 comprising carrier 81 to mechanical vibrations. These expressions are relevant for embodiments discussed in relation to FIGS. 8 and 9*b* having cross sections as discussed in relation to FIGS. 3.*a* to 3.*i* and for embodiments discussed in relation to FIGS. 11-14 and 15.*b*.

It can be assumed that the neutral axis is not changed by small changes of h if R is large (i.e. e.g. R>10H, where H is the height of the carrier, cf. FIG. 12.*a*) and the width $W_g$ of the groove is small compared to the width W and height H of the cross-section of the carrier (FIG. 12.*b*) (i.e. e.g. Wg/W<0.30). Assuming that the package is deformed by pure bending, it is known from beam theory that the axial strain (axial meaning along a centre axis of the optical fibre located in the package) increases linearly with the distance from the neutral axis (cf. e.g. J. M. Gere and S. P. Timoshenko, "Mechanics of Materials", Fourth SI Edition, Stanley Thomes (Publishers) Ltd., 1999).

EXAMPLE 1

Ad hoc Approximation of h for a DFB Fibre Laser

Integrating the axial strain over the length of the optical fiber gives:

$$\int \varepsilon(y) dl = -\int Cy \, dl$$
$$= -2C \int_0^{\alpha_L} (R\cos(\alpha) - (R-h)) d\alpha$$
$$= -2C(R\sin(\alpha_L) - (R-h)\alpha_L)$$

where y is the coordinate perpendicular to a neutral axis (i.e. to the longitudinal direction of the carrier), $\alpha_L = \arcsin(L/2R)$. Setting this expression to zero and solving for the distance h from the neutral axis (87 in FIG. 12.*a*) gives:

$$h = R - \frac{L}{2\arcsin\left(\frac{L}{2R}\right)} \approx \frac{L^2}{24R}$$

The expression weights the importance of the axial strain equally along the length of a DFB fibre laser. Results of calculations of h are shown in the table below for different values of the carrier length L and radius R of the convex carrier surface.

TABLE 1

Exemplary calculations of h for typical values of L, R.

| L [mm] | R [m] | h [μm] |
|---|---|---|
| 75 | 1.5 | 156 |
| 50 | 1.5 | 69.4 |
| 50 | 1.0 | 104 |

According to these calculations, h decreases rapidly when L is decreased.

EXAMPLE 2

A More Precise Approximation of h for a DFB Fibre Laser

A more precise approximation of the optimal value of h is obtained by requiring that the lasing frequency shift is zero when the package is subjected to pure bending. The frequency shift of a DFB fiber laser affected by a distributed strain field is may be derived from [S. Foster, "Spatial Mode Structure of the Distributed Feedback Fibre Laser", IEEE J. Quant. Elect., 40, July 2004] as:

$$\Delta\omega(t) = L_c \omega \int \varepsilon(z,t) e^{-2\kappa z} dz$$

Where $\Delta\omega$ is the frequency shift, $L_c$ is the cavity length, $\omega$ is the lasing frequency, $\varepsilon$ is axial strain, $\kappa$ is the grating strength and z is the direction along the fiber length. The axial strain for pure bending along a circle segment is given as:

$$\varepsilon(z,t) = -C(t)y = -C(t)(\sqrt{R^2 - z^2} - R + h)$$

The frequency shift can be found analytically by integration over the length of the fiber laser and an optimal value of h can be found by setting the obtained frequency shift to zero and solving the resulting equation for h and thus obtaining:

$$h = R - \frac{2\kappa}{1 - e^{-\kappa L}} \int_0^{L/2} e^{-2\kappa z} \sqrt{R^2 - z^2} \, dz$$

i.e.

$$h \approx \frac{1}{4R\kappa^2}$$

for $1 \ll \kappa L$

Results for the calculation of h for different values of L, R and κ are given in Table 1 below, the column with the header 'h [μm]' representing the more accurate values from the exact formula given above and the column with the header '(≈h [μm])' representing values calculated from the approximate formula given above in the approximation $1 \ll \kappa L$.

TABLE 2

Example calculations of h for typical values for L, R and κ.

| L [mm] | R [m] | κ [m⁻¹] | h [μm] | (≈h [μm]) |
|---|---|---|---|---|
| 75 | 1.5 | 150 | 7.40 | (7.41) |
| 60 | 1.5 | 150 | 7.36 | (7.41) |
| 50 | 1.5 | 150 | 7.26 | (7.41) |
| 75 | 1.0 | 150 | 11.10 | (11.11) |

TABLE 2-continued

Example calculations of h for typical values for L, R and κ.

| L [mm] | R [m] | κ [m$^{-1}$] | h [μm] | (≈h [μm]) |
|---|---|---|---|---|
| 75 | 1.5 | 100 | 16.34 | (16.67) |
| 75 | 1.0 | 100 | 24.51 | (25.00) |

It is seen from Table 2 that h is relatively small (compared to a physical height dimension of a carrier in the mm-range) and relatively independent of the length L of the carrier. It is further seen that the approximate formula provides results (rightmost column with data in parenthesis) that are quite close to those of the exact formula (the last but one column). For the approximate calculations, $\kappa L \geq 7.5$.

EXAMPLE 3

Packages with Improved Tuning Options

FIG. 13 shows examples of elongate packages comprising one or more sections of piezoelectric material according to the invention.

Generally, the choice of material for the carrier is made with a view to the optical fibre base material (and possibly by including the degree of pre-straining of the optical fibre) to be supported by the carrier. Thereby account can be taken for possible differences in temperature dependence of the respective thermal coefficients of expansion to ensure that no escaping occurs in a predetermined temperature range during operation.

In an embodiment, a major part of the volume of the package determining the thermal expansion of the carrier surface comprises Aluminum. This has the advantage of providing a thermally conductive carrier, a relatively cheap material and an attractive material for machine working. If only the fast modulation is of interest, a material having a low coefficient of thermal expansion such as Invar®, or a material having a coefficient of thermal expansion similar to that of the optical fibre, are used for the major part of the carrier. In still other embodiments, a ceramic or a piezoelectric material may be used for the major part or the carrier.

The four different carriers 81 of FIGS. 13.a to 13.d comprise at least two different materials 71, 72. One part of the carrier is made of a material-1 having a relatively high thermal expansion coefficient, whereby tuning over a relatively large wavelength range can be obtained by heating or cooling the carrier or a part of the carrier, the tuning being of a relatively slow nature, however. Another part of the carrier is made of a material-2 for which a physical dimension can be modulated at a relatively high frequency, whereby a relatively fast tuning of the wavelength can be obtained, the tuning being typically over a relatively small wavelength range, however. By making a carrier partly of material-1 and partly of material-2, a combination of the two properties can be provided, i.e. large thermal tuning and a fast modulated tuning.

Material-1 may be any suitable material having a relatively high thermal expansion coefficient. Other relevant parameters for the carrier are thermal conductivity (preferably relatively high), machine workability, etc. The thermal expansion coefficient of material-1 is to be related that of to the material-2. A relatively high thermal expansion coefficient may thus be one that is larger than that of material-2. A relatively high thermal expansion coefficient may thus be larger than $\alpha_{T-2}$, such as larger than $1.5*\alpha_{T-2}$, such as larger than $2*\alpha_{T-2}$, such as larger than $5*\alpha_{T-2}$, such as larger than $10*\alpha_{T-2}$. For a piezoelectric ceramic material, the coefficient of thermal expansion may be in the range from $1*10^{-6}$ C.$^{-6}$ to $5*10^{-6}$ C.$^{-1}$. A relatively high thermal expansion coefficient may be taken to be larger than $10*10^{-6}$ C.$^{-1}$, such as larger than $20*10^{-6}$ C.$^{-1}$, such as larger than $25*10^{-6}$ C.$^{-1}$. Material-1 may be selected from the group of materials comprising Al, Cu, and alloys thereof, and a ceramic material, such as, and combinations thereof. In general, the carrier may be be designed using materials having positive, zero or negative thermal expansion coefficients (cf. e.g. WO-99/27400), or appropriate combinations thereof.

Material-2 may be any material for which a physical dimension may be modulated at a range of modulation frequencies, such as a piezoelectric material, an electrostrictive or a magnetostrictive material. The modulation frequency is to be seen relative to the possible thermal cycling frequencies of material-1. The modulation frequency is advantageously smaller than 10 MHz, preferably in the range from 0.1 Hz to 100 kHz, such as in the range from 10 Hz to 40 kHz, such as from 20 Hz to 20 kHz. Material-2 may be selected from the group of materials comprising piezoelectric materials, such as piezoelectric ceramic material, such as polycrystalline ferroelectric ceramic materials, such as barium titanate and lead (plumbum) zirconate titanate (PZT) and combinations thereof.

Material-1 is preferably taken to be Aluminum and indicated as white in FIG. 13 (referred to as reference numeral 72) whereas material-2 is preferably taken to be a piezoelectric ceramic material and indicated as grey in FIG. 13. All 4 packages have a convex laser carrier surface such that noises from mechanical vibrations are reduced.

The four different carriers 81 of FIGS. 13.a to 13.d are shown in a longitudinal cross section (left) and in a transversal cross section (right) perpendicular to the longitudinal cross section midway between its ends 76, 77 along line 75 ('center cross section'). All four embodiments have at least one substantially planar surface 89 for easy mounting on a planar support. This need not be the case, however. Alternatively, the carrier may have curved outer surfaces, cf. e.g. FIGS. 4, 5, 6, 9, 10. In all four embodiments, the carrier is symmetrical around the centre line 75. Although this is preferred, it need not be the case, however.

All four embodiments in FIG. 13 illustrate an article according to the invention comprising an elongate (beam shaped) carrier having (at least one, here all) planar outer surfaces (appropriate for mounting on a planar support) with a carrier 81 of length L, width W and height H with a groove 83 having a convex carrier surface 86, which is adapted for mounting an optical fibre (e.g. an optical fibre laser) affixed 93 at each end (as indicated on FIG. 13.d) under longitudinal tension. The carrier surface—although preferably is—need not be curved. Alternatively, it may be planar, cf. e.g. FIG. 1. Alternatively, one or more outer surfaces of the carrier may be curved, cf. e.g. embodiments of FIGS. 4.a and 4.b. In these embodiments, one of the ('side'-) surfaces may advantageously be adapted to be suitable for mounting on a planar support.

The cross-section of the package perpendicular to the longitudinal direction of the optical fibre (i.e. the right-hand cross sections in FIGS. 13.a-13.d) may take on any convenient form, including those illustrated in FIGS. 3.a-3.i (including embodiments omitting the second closing body 35 of the two-body packages), while—optionally—still maintaining the convex 'longitudinal' form of the carrier surface. Although preferably comprising an outer surface that is suitable for mounting on a planar support, the carrier may have any convenient cross-sectional form in a direction perpendicular to a longitudinal direction of the supported part of the optical fibre when mounted on the carrier, including those of FIG. 3.*j* to 3.*l*.

FIG. 13.*a* shows a carrier wherein a section 71 of the carrier 81 is constituted by a piezoelectric material having substantially the same cross section as the rest of the carrier, i.e. substantially continuing the cross section of the adjacent carrier sections 72 of Al. The dimension of the section of the piezoelectric material in the longitudinal direction of the carrier (represented by the left cross section of FIG. 13) is e.g. less than 25% of the length of the total carrier, such as less than 20%, such as less than 10%. In one embodiment, where the length L of the carrier is 75 mm, the length of the piezoelectric section may preferably be in the range from 1 mm to 10 mm, such as from 2 mm to 5 mm, e.g. around 3 mm. In FIG. 13.*a* the section of piezoelectric material is located away from the central part of the carrier near one of its ends. Preferably, the modulating body is located near the centre of the Bragg grating to achieve a relatively high modulation. However, in cases where the mechanical tolerances on the piezoelectric material are difficult to control, it may be advantageous to locate it away for the (sensitive) centre of the grating. The solution of FIG. 13.*a* provides good temperature tuning because the centre part of the carrier where the central sensitive section of the Bragg grating is located is made of a material with a high thermal expansion coefficient (e.g. 45 pm/K for a 1550 nm laser housed in a Al-carrier).

The only difference between FIG. 13.*a* and FIG. 13.*b* is that the embodiment of FIG. 13.*b* comprises two sections 71 constituted by a piezoelectric material. The sections may preferably be symmetrically located around the centre 75 of the carrier and have the same longitudinal dimension. This solution has the advantage of providing good temperature tuning and a symmetrical loading. The term 'symmetrical loading' is in the present context taken to mean that it provides a symmetrical strain field in the optical fibre. Alternatively, the two sections may be asymmetrically located and/or have different longitudinal dimensions.

In the embodiments of FIGS. 13.*a* and 13.*b*, the groove 83 wherein the optical waveguide is placed is shown as upwardly open. Typically a body is applied to the top of the groove thereby forming a cavity (or through-going opening) for the waveguide (cf. 73 in FIGS. 13.*c* and 13.*d*), as e.g. illustrated in FIGS. 3.*b*, 3.*c*, 3.*f*.

In FIG. 13.*c* a centrally located, longitudinally extending section 71 of a piezoelectric material is formed as a lid (e.g. a plate) closing the channel or groove 83 wherein the optical fibre is supported, thereby forming a tubular volume 73 around the optical fibre. The solution of FIG. 13.*c* provides symmetrical loading.

In FIG. 13.*d* a centrally located, longitudinally extending section 71 of a piezoelectric material is formed as a U (e.g. a plate) closing the channel or groove 83 thereby forming a tubular volume 73 wherein the optical fibre is supported. The part 72 of the carrier 81 being of Al may be made in one piece where the part constituted by the U-formed section of a piezoelectric material is removed by a numerically controlled machine The solution of FIG. 13.*d* provides symmetrical loading. Fix-points 93 of the optical fibre are indicated close to the longitudinal ends 76, 77 of the carrier.

In the embodiments of FIG. 13, two different materials are used for specific segments of the carrier. Alternatively, more than two materials may be used.

The different bodies of the carrier may be joined by any convenient of the various joining methods known, such as an adhesive/glue.

EXAMPLE 4

Physical Dimensions of an Exemplary Package

Table 3 gives an example preferred dimensions of a carrier for a package according to the invention suitable for thermal tuning of the wavelength:

TABLE 3

Dimensions of an exemplary carrier according to the invention

| | | |
|---|---|---|
| H | Height of carrier | 3.0 + 0.0/−0.1 mm |
| L | Length of carrier | 75.0 + 0.0/−0.1 mm |
| W | Width of carrier | 3.0 + 0.0/−0.1 mm |
| $H_g$ | Height of groove | 1.00+/−0.05 mm |
| $W_g$ | Width of groove | 0.34 + 0.05/−0.0 mm |
| $h_c$ | Height of curved carrier surface | 0.4688 mm (calculated) |
| R | Radius of circle defining carrier surface | 1500 mm |
| h | Distance from neutral axis at top point of carrier surface | 7.40 μm (cf. table 2) |

The parameters of the package given in Table 3 are to be understood with reference to FIG. 12. The package carrier is manufactured in Al using arc erosion processing for forming the groove wherein the optical fibre is located. The optical fibre is mounted in the groove and fixed at points near the longitudinal ends of the carrier (cf. e. 93 in FIG. 3.*d*).

$h_c$ is calculated from the following formula:

$$h_c = R \cdot \left(1 - \sqrt{1 - \left(\frac{L}{2R}\right)^2}\right)$$

EXAMPLE 5

Tuning of a Carrier with a Piezoelectric Slab

FIG. 14 shows an embodiment of the invention in the form of a carrier 81 provided with a piezoelectric slab 71 of the type schematically illustrated in FIG. 13.*a*. This embodiment is suitable for (relatively slow) thermal modulation and (relatively fast) electric modulation of the carrier.

In a preferred embodiment, the dimensions of the carrier are the same as in EXAMPLE 4 above (cf. Table 3).

The dimensions of the piezoelectric slab are given in the following Table 4:

TABLE 4

Dimensions of a piezoelectric slab in an exemplary carrier according to the invention

| | | |
|---|---|---|
| $H_{pz}$ | Height of piezoelectric slab | 5 mm |
| $L_{pzt}$ | Length of piezoelectric slab | 3 mm |
| $W_{pz}$ | Width of piezoelectric slab | 5 mm |
| $H_{g,pz}$ | Height of groove of piezoelectric slab | 3.3 mm |
| $W_{g,pz}$ | Width of groove of piezoelectric slab | 0.8 mm |

The length $L_f$ of the fibre between the fix-points (cf. e.g. points 93 on FIG. 13 coinciding with glue reservoirs 58 on FIG. 14) on the carrier is 68 mm (compared to the physical length of the carrier of 75 mm).

An optical (here) silica-based fibre is fixed at glue reservoirs 58 to the carrier surface 86 of the groove 83 under axial tension at locations near the longitudinal ends of the carrier (such as 1-5 mm from the ends). Strain reliefs 53 are provided at each end of the carrier to ease the handling of the fibre and carrier.

The tuning range Δλ of the wavelength λ may be expressed as $$\Delta\lambda(nm) = 0.78 * \lambda(nm) * dx(\mu m)/L_f(\mu m)$$

where 0.78 is the elasto-optic coefficient dn/dε (of the optical fibre, here silica based) representing the change of its refractive index n with strain ε in the longitudinal direction (cf. e.g. WO-99/27400), dx is the change of longitudinal dimension of the optical fibre and $L_f$ is the length of the fibre between its fix points on the carrier surface.

The change dx of longitudinal dimension of the piezoelectric slab may be expressed as $$dx(\mu m) = d_{33}(m/V) * E(V/m) * L_{pzt}(\mu m)$$

where, $d_{33}$ is the piezoelectric strain coefficient in the longitudinal direction of the piezoelectric material (and carrier), E is the applied electric filed strength (in the same direction) and $L_{ptz}$ is the dimension of the piezoelectric slab in the longitudinal direction of the carrier.

For $L_f$=68 mm, $L_{ptz}$=3 mm, $d_{33}$=425 pC/N (Pz27 material) $E_{max}$=3 MV/m and λ=1550 nm we get the following corresponding values of Δx and Δλ:

$$\Delta x_{max} = 3.82 \ \mu m, \Delta\lambda_{max} = 68 \text{ pm for Pz27}$$

Pz27 is a piezo-ceramic material from Ferroperm Piezoceramics A/S (Kvistgaard, DK3490—Denmark, http://www.ferroperm-piezo.com)

Piezoelectric and/or piezorestrictive materials may e.g. be acquired from Noliac (Kvistgaard DK-3490, Denmark, http://www.noliac.com/) or Piezo systems, Inc. (Cambridge, Mass. 02139, USA, http://www.piezo.com/).

EXAMPLE 6

Various Multibody Carriers Comprising a Tunable Material

FIG. 15 shows various examples of multibody carriers 81 comprising at least one body 71 of a material that is suitable for external modulation of a dimension of the body in a direction of the supported part of the optical fibre when mounted on the carrier surface. In the embodiments shown in FIGS. 15.a to 15.h, the carrier comprises two different materials 71, 72. Alternatively, the carrier may comprise more than two materials to optimize its properties. E.g. in the embodiment of FIG. 5.g, the 4 pieces of material-1 72 between the 4 bodies of material-2 71 may be of different materials, e.g. either 2 and 2 or 4 different. Also the 4 pieces of externally modulatable material (material-2) 71 may be different.

FIG. 15.a and FIG. 15.b show articles 80 with carriers 81 having 'strongly' convex (semicircular solid, FIG. 5.a) and 'weakly' convex (FIG. 15.b) carrier surfaces where an optical fibre 92 is affixed to the carrier surface at points 93 on each side of at least one fibre Bragg grating in the optical fibre.

Both embodiments are shown to have substantially planar carrier faces 89 opposite the carrier surface adapted for supporting the optical fibre. This has the advantage of easing the placement or mounting of the package in a system environment comprising planar objects (such as most conventional electro-optical system assemblies). One or both of the side surfaces parallel to the longitudinal direction of the optical fibre (i.e. the outer carrier or package surfaces parallel to the cross sections facing the viewer of FIGS. 15.a and 15.b) may advantageously be substantially planar to facilitate side-mounting on a planar substrate.

The optical fibre may or may not be located in a groove. In case the fibre 92 is located in a groove, the shown convex shape of the carrier surface is taken to be the shape of the carrier surface in the groove bottom where physical contact between carrier and fibre is present.

In the semi-circular carrier of FIG. 15.a two pieces of material 71 adapted for being externally modulated is shown, one being a radially limited piece and the other being a parallel piece. Alternatively, only one of the pieces of material 71 may be present.

FIG. 15.c shows an article 80 with the carrier 81 and optical fibre 92 being mounted on the convex surface at points 93. The bottom surface 109 (opposite the carrier surface used for supporting the optical fibre 92) has a shape substantially identical to that of the carrier surface. One or both of the side surfaces 89 parallel to the longitudinal direction of the optical fibre may advantageously be substantially planar to facilitate side-mounting on a planar substrate.

In the embodiments of FIGS. 15.b and 15.c, the body 71 is located between the centre of the carrier and one of its ends (i.e. asymmetrically with respect to the centre).

FIGS. 15.d and 15.e show a half circle carrier and a part elliptical carrier, respectively. The carriers comprises a body 71 of a material adapted to be externally modulated, surrounded by another carrier material 72. At least the side surface 89 is essentially planar. In the half circle carrier of FIG. 15.d, the modulatable body 71 is located between the centre of the carrier and one of its ends (i.e. asymmetrically with respect to the centre), whereas it is located symmetrically with respect to the centre of the carrier in the part elliptical carrier of FIG. 15.e.

Compared to the half-circle and part-elliptical embodiments of FIGS. 15.d and 15.e, respectively, the fundamental resonance frequency can be increased by closing the carrier path. FIGS. 15.f and 15.g show A full elliptical and full circle carrier, respectively. The full circle carrier of FIG. 15.f comprises 4 symmetrically distributed pieces of e.g. piezoelectric material 71, whereas the elliptical carrier of FIG. 15.g comprises 2 pieces oppositely located on the long axis.

By making a groove in the carriers of FIGS. 15.b to 15.g, it is possible to fix the laser (i.e. the supported part of the optical fibre comprising a fibre Bragg grating) at the neutral axis (in this case constituting a section of a circle). It should be mentioned that for the embodiment of FIG. 15.b, the neutral axis may be approximated as discussed in EXAMPLE 2 above. The groove depth of the cross section can be calculated in the same way as for straight packages, if the cross sectional area is small compared to the radius of the half-circle package. The cross-section of the package perpendicular to the longitudinal direction of the optical fibre (and perpendicular to the planar views of FIGS. 15.a to 15.g) may take on any convenient form, including those illustrated in FIGS. 3.a-3.l.

FIG. 15.h shows an article 80 comprising carrier 81 formed as a slab of a solid cylinder, e.g. of Al 72 wherein a body 71 of a material that can be externally modulated is inserted. Side surfaces 89 of the slab carrier are substantially planar and thus adapted for being mounted on a planar substrate. The optical fibre 92 may be located directly on the carrier surface 86 or in a groove, respectively. The optical fibre 92 comprises a fibre Bragg grating 64 located between fix points 93 of the optical fiber to the carrier surface 86 (the supported part of the optical fibre).

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

The invention claimed is:

1. An article comprising a length of an optical fibre for a laser and a package,
   the optical fibre comprising a fibre Bragg grating dispersed over a FBG-section of the length of the optical fibre,
   the package comprising a carrier with a convex carrier surface adapted for supporting at least a supported part of the optical fibre including the FBG-section,
   the supported part of the optical fibre being mounted on the carrier surface and fixed to the carrier surface on each side of said FBG-section of the optical fibre, the supported part of the optical fibre being held in longitudinal tension during use of the article so as to urge the supported part of the optical fibre against the convex carrier surface so as to prevent or reduce escaping of the supported part of the optical fibre from the convex carrier surface during use of the article, wherein at the supported part of the optical fiber, the optical fiber is in longitudinal tension through an entire cross section of the fiber taken perpendicular to the length of the fiber.

2. The article according to claim 1, wherein the supported part of the optical fibre comprises an optically active region.

3. The article according to claim 1, wherein the carrier has at least one outer surface suitable for being mounted on a planar support.

4. The article according to claim 1, wherein said carrier surface is substantially part of a circle, such as semicircular, when viewed in a cross section along the length of the supported part of the optical fibre.

5. The article according to claim 1, wherein said carrier surface is a part of a cylindrical surface.

6. The article according to claim 5, wherein said cylindrical carrier surface comprises a through going opening.

7. The article according to claim 5, wherein said cylindrical carrier surface is part of a solid package.

8. The article according to claim 1, wherein the carrier is elongated.

9. The article according to claim 1, wherein a path of physical contact between the supported part of the optical fibre and the carrier surface supporting the optical fibre is convex in a longitudinal direction of the optical fibre.

10. The article according to claim 8, wherein said supported part of the optical fibre is located substantially along a neutral axis of said package.

11. The article according to claim 1, wherein said supported part of the optical fibre is located substantially along a shear centre path of the package thereby providing minimum elongation of the optical fibre due to torsional deformation modes.

12. The article according to claim 2, wherein the fibre Bragg grating is fully or partially located in the optically active region of the optical fibre.

13. The article according to claim 2, wherein the fibre Bragg grating is located substantially outside the optically active region of the optical fibre.

14. The article according to claim 1, wherein said carrier surface for supporting at least a supported part of the optical fibre is located in a groove in said carrier.

15. The article according to claim 14, wherein said groove has a rectangular cross section.

16. The article according to claim 14, wherein the cross-sectional form of said groove is adapted to the cross sectional form of said supported part of said optical fibre.

17. The article according to claim 14, wherein said carrier has a substantially rectangular outer boundary when viewed in a cross section perpendicular to a longitudinal direction of said optical fibre when mounted in said groove.

18. The article according to claim 1, wherein said supported part of said optical fibre when located on said carrier surface is fully or partially surrounded by a filling material.

19. The article according to claim 1, wherein said carrier comprises a through-going opening wherein at least the supported part of said optical fibre is located.

20. The article according to claim 19, wherein said carrier comprises several, preferably two, cooperating bodies which when assembled provide said through-going opening.

21. The article according to claim 19, wherein said through-going opening has a cross-sectional form adapted to the cross-sectional form of said optical fibre.

22. The article according to claim 1, wherein the curvature of the curve defined by the path of contact of the supported part of the optical fibre with the carrier surface is in a range from 0.004 m$^{-1}$ to 200 m$^{-1}$.

23. The article according to claim 1, wherein the part of said carrier surface supporting the optical fibre has a rugged surface comprising peaks or ridges and dents or valleys, wherein when viewed in a longitudinal direction of the fibre the distance between adjacent peaks or ridges is so small that an eigen-frequency for the optical fibre suspended between adjacent peaks or ridges is greater than 5 kHz.

24. The article according to claim 23, wherein said distance between adjacent peaks or ridges is less than 10 mm.

25. The article according to claim 1, wherein said carrier comprises at least two materials.

26. The article according to claim 25, wherein said carrier comprises at least one second body of a material whose longitudinal dimension is specifically adapted to be externally modulated.

27. The article according to claim 26, wherein said second body comprises a material whose longitudinal dimension is specifically adapted to be electrically modulated.

28. The article according to claim 26, wherein said second body comprises a piezoelectric material.

29. The article according to claim 28, wherein said piezoelectric material is selected from the group of piezoelectric ceramic materials consisting of polycrystalline ferroelectric ceramic materials, barium titanate, and lead zirconate titanate (PZT).

30. The article according to claim 25, wherein said carrier comprises a first body of a material which is specifically adapted be thermally modulated in the longitudinal dimension of the carrier.

31. The article according to claim 30, wherein the coefficient of thermal expansion $\alpha_{T-1}$ of the material constituting said first body in a longitudinal direction of the carrier is substantially equal to the coefficient of thermal expansion $\alpha_{T-2}$ of the material constituting said second body.

32. The article according to claim 30, wherein the coefficient of thermal expansion $\alpha_{T-1}$ of the material constituting said first body in a longitudinal direction of the carrier is greater than the coefficient of thermal expansion $\alpha_{T-2}$ of the material constituting said second body.

33. The article according to claim 30, wherein said first body comprises a material selected from the group consisting of a metal, an alloy thereof, and a ceramic material.

34. The article according to claim 30, wherein said first body constitutes the majority of the volume of said carrier.

35. The article according to claim 26, wherein the at least one second body is located asymmetrically with respect to a cross section of the carrier perpendicular to its longitudinal direction midway between the longitudinal ends of said carrier.

36. The article according to claim 26, wherein the at least one second body is located symmetrically with respect to a cross section of the carrier perpendicular to its longitudinal direction midway between the longitudinal ends of said carrier.

37. The article according to claim 1, wherein said supported part of the optical fibre comprises two spatially separated fibre Bragg gratings.

38. The article according to claim 1, wherein the laser is a DBR laser, and wherein said optical fibre and said fibre Bragg grating(s) form part of said DBR laser.

39. The article according to claim 1, wherein the laser is a DFB laser, and wherein said optical fibre and said fibre Bragg grating form part of said DFB laser.

40. The article according to claim 1, wherein said optical fibre is a silica based optical fibre.

41. The article according to claim 1, wherein said optical fibre comprises longitudinally extending micro-structures.

42. The article according to claim 1, wherein said optical fibre is a double-clad optical fibre.

43. The article according to claim 1, wherein the curve defined by the path of contact of the supported part of the optical fibre with the carrier surface is substantially part of a circle having a radius R, the carrier having a longitudinal extension L, the Bragg grating having a grating strength K, the carrier having a neutral axis N wherein the distance h between said circle and said neutral axis in a transversal cross section midway between the longitudinal ends of the carrier is substantially equal to $(4Rk)^{-1}$ for kL being larger than 1.

44. The article according to claim 43, wherein kL is greater than 2.

45. The article according to claim 43, wherein the distance h between said circle and said neutral axis in a transversal cross section midway between the longitudinal ends of the carrier is substantially equal to 0.

46. An apparatus comprising the article according to claim 1.

47. The apparatus according to claim 46 constituting or being part of a LIDAR system or an interferometric system.

48. A method of using the article of claim 1, comprising: incorporating the article of claim 1 into an apparatus.

49. The method of claim 48, wherein the apparatus constitutes or is part of a LIDAR system or an interferometric system.

50. A method of producing an article, the method comprising:
(a) providing a length of an optical fibre for a laser, said optical fibre comprising a fibre Bragg grating for selection of a wavelength of light propagated in the optical fibre, the fibre Bragg grating being dispersed over a FBG-section of the length of the optical fibre,
(b) providing a carrier for supporting said optical fibre, said carrier comprising: a convex carrier surface for supporting at least a supported part of said optical fibre,
(b1) adapting said convex carrier surface to provide that a path of physical contact between the supported part of the optical fibre and the convex carrier surface supporting the optical fibre is convex in a longitudinal direction of the optical fibre and is adapted to remain convex during use of the article, and
(c) mounting the supported part of said optical fibre in longitudinal tension on said carrier surface, including at least said FBG-section of the length of the optical fibre, in such a way that the optical fibre is fixed to the convex carrier surface on each side of said FBG-section of the optical fibre to urge the supported part of the optical fibre against the convex carrier surface so as to prevent or reduce escaping of the supported part of the optical fibre from the convex carrier surface during use of the article, wherein at the supported part of the optical fiber, the optical fiber is in longitudinal tension through an entire cross section of the fiber taken perpendicular to the length of the fiber.

51. The method according to claim 50 further comprising the step of adapting said the package to minimize mechanical (e.g. acoustic) vibrations from the environment.

52. The method according to claim 50, wherein step (b) further comprises the step of providing that (b2) said carrier comprises at least two bodies of different materials.

53. The method according to claim 50, wherein step (b) further comprises the step of providing that (b3) said carrier comprises a material suitable for being externally modulated in a longitudinal dimension of the carrier.

54. The method according to claim 50, wherein step (b) further comprises the step (b4) of providing that said different materials comprise a first material adapted to be thermally modulated in a longitudinal direction of the carrier and a second material adapted to be externally modulated in a longitudinal direction of the carrier.

55. The method according to claim 50, wherein step (b) further comprises the step (b5) of providing that the carrier comprises at least one outer surface suitable for being mounted on a planar support.

56. The method according to claim 50, wherein the method further comprises the steps of
(d1) providing that a curve defined by the path of contact of the supported part of the optical fibre with the carrier surface is substantially part of a circle having a radius R, and that the carrier has a longitudinal extension L,
(e1) providing that the Bragg grating has a grating strength k,
(f1) determining a neutral axis N of the carrier,
(g1) providing that the distance h between said circle and said neutral axis in a transversal cross section midway between the longitudinal ends of the carrier is substantially equal to $(4Rk)^{-1}$ for kL being larger than 1.

57. The method according to claim 56, wherein step (g1) is substituted by the step (g2) of providing that the distance h between said circle and said neutral axis in a transversal cross section midway between the longitudinal ends of the carrier is substantially equal to 0.

58. The method according to claim 50, wherein step (a) further comprises the step (a1) of providing that an optically active region is formed in the supported part of the optical fibre.

59. The method according to claim 58, wherein step (a1) further comprises the step (a1.1) of providing that the optically active region fully or partially overlaps with the spatial extension of the fibre Bragg grating.

60. The method according to claim 58, wherein step (a1) further comprises the step (a1.2) of providing that the optically active region does not substantially overlap with the spatial extension of the fibre Bragg grating.

61. The method according to claim 50, wherein step (a) further comprises the step (a2) of providing that the supported part of the optical fibre comprises at least two separate lengths of optically fibre that are optically connected to each other.

62. The method according to claim 61, wherein step (a2) further comprises the step (a2.1) of providing that the fibre Bragg grating is formed in a length of an optically passive optical fibre.

63. The article according to claim 1, wherein said carrier surface is a part of a cylindrical surface having a substantially elliptical or circular cross section.

64. The article according to claim 18, wherein the mass density of the filling material is selected from a range within 100% of the mass density of said optical fibre.

65. The article according to claim 18, wherein the mass density of the filling material is selected from a range within 50% of the mass density of said optical fibre.

66. The article according to claim 1, wherein the curvature of the curve defined by the path of contact of the supported part of the optical fibre with the carrier surface is in a range from $0.004 \text{m}^{-1}$ to $1 \text{ m}^{-1}$.

67. The article according to claim 1, wherein the curvature of the curve defined by the path of contact of the supported part of the optical fibre with the carrier surface is in a range from $0.1 \text{ m}^{-1}$ to $50 \text{ m}^{-1}$.

68. The article according to claim 1, wherein the part of said carrier surface supporting the optical fibre has a rugged surface comprising peaks or ridges and dents or valleys, wherein when viewed in a longitudinal direction of the fibre the distance between adjacent peaks or ridges is so small that an eigen-frequency for the optical fibre suspended between adjacent peaks or ridges is greater than 25 kHz.

69. The article according to claim 23, wherein said distance between adjacent peaks or ridges is less than 2 mm.

70. The article according to claim 43, wherein kL is greater than 5.

71. The article according to claim 43, wherein kL is greater than 10.

72. The article according to claim 14, wherein said package is beam-shaped.

\* \* \* \* \*